(12) United States Patent
Kim et al.

(10) Patent No.: US 10,649,898 B2
(45) Date of Patent: May 12, 2020

(54) MEMORY SYSTEM, MEMORY CONTROLLER FOR MEMORY SYSTEM, OPERATION METHOD OF MEMORY CONTROLLER, AND OPERATION METHOD OF USER DEVICE INCLUDING MEMORY DEVICE

(71) Applicant: SAMSUNG ELECTRONICS CO., LTD., Suwon-si, Gyeonggi-Do (KR)

(72) Inventors: Jinwoo Kim, Seoul (KR); Kui-Yon Mun, Hwaseong-si (KR); Chul Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 25 days.

(21) Appl. No.: 15/871,283

(22) Filed: Jan. 15, 2018

(65) Prior Publication Data

US 2019/0004949 A1 Jan. 3, 2019

(30) Foreign Application Priority Data

Jul. 3, 2017 (KR) ........................ 10-2017-0084198

(51) Int. Cl.
*G06F 12/084* (2016.01)
*G06F 3/06* (2006.01)
*G06F 13/16* (2006.01)

(52) U.S. Cl.
CPC .......... *G06F 12/084* (2013.01); *G06F 3/0611* (2013.01); *G06F 3/0614* (2013.01); *G06F 3/0656* (2013.01); *G06F 3/0658* (2013.01); *G06F 3/0679* (2013.01); *G06F 3/0688* (2013.01); *G06F 13/1673* (2013.01); *G06F 2212/1024* (2013.01); *G06F 2212/2022* (2013.01); *G06F 2212/221* (2013.01); *G06F 2212/62* (2013.01); *G06F 2213/28* (2013.01)

(58) Field of Classification Search
CPC combination set(s) only.
See application file for complete search history.

(56) References Cited

U.S. PATENT DOCUMENTS 7,774,537 B2 8/2010 Pyeon et al.
7,802,130 B2 9/2010 Lee et al.
(Continued)

*Primary Examiner* — Ilwoo Park
*Assistant Examiner* — Juanito Borromeo
(74) *Attorney, Agent, or Firm* — Volentine, Whitt & Francos, PLLC

(57) ABSTRACT

A system includes: a nonvolatile memory; a memory controller configured to control the nonvolatile memory, the memory controller including a first buffer memory for temporarily storing write data to be written to the nonvolatile memory; and a second buffer memory having a lower operational speed and a higher memory capacity than the first buffer memory. The memory controller is configured to transmit the write data from the first buffer memory to the second buffer memory and to the nonvolatile memory, and to release an operational state of the first buffer memory after transmitting the write data from the first buffer memory to the second buffer memory and to the nonvolatile memory. Writing additional write data to the first buffer memory is prohibited prior to the release of the operational state of the first buffer memory, and is permitted after the release of the operational state of the first buffer memory.

17 Claims, 20 Drawing Sheets

(56) References Cited

U.S. PATENT DOCUMENTS

| | | |
|---|---|---|
| 7,818,477 B2 | 10/2010 | Toyama et al. |
| 8,880,778 B2 | 11/2014 | Pasquale et al. |
| 9,208,901 B2 | 12/2015 | Pasquale et al. |
| 9,251,054 B2 * | 2/2016 | Cordero .............. G06F 11/0793 |
| 9,454,551 B2 | 9/2016 | Alcantara et al. |
| 9,471,242 B2 | 10/2016 | Jones et al. |
| 2007/0297433 A1 * | 12/2007 | Lin ..................... G06F 13/4059 |
| | | 370/412 |
| 2014/0075106 A1 * | 3/2014 | Okin ....................... G11C 5/04 |
| | | 711/105 |
| 2017/0003909 A1 | 1/2017 | Cho |

* cited by examiner

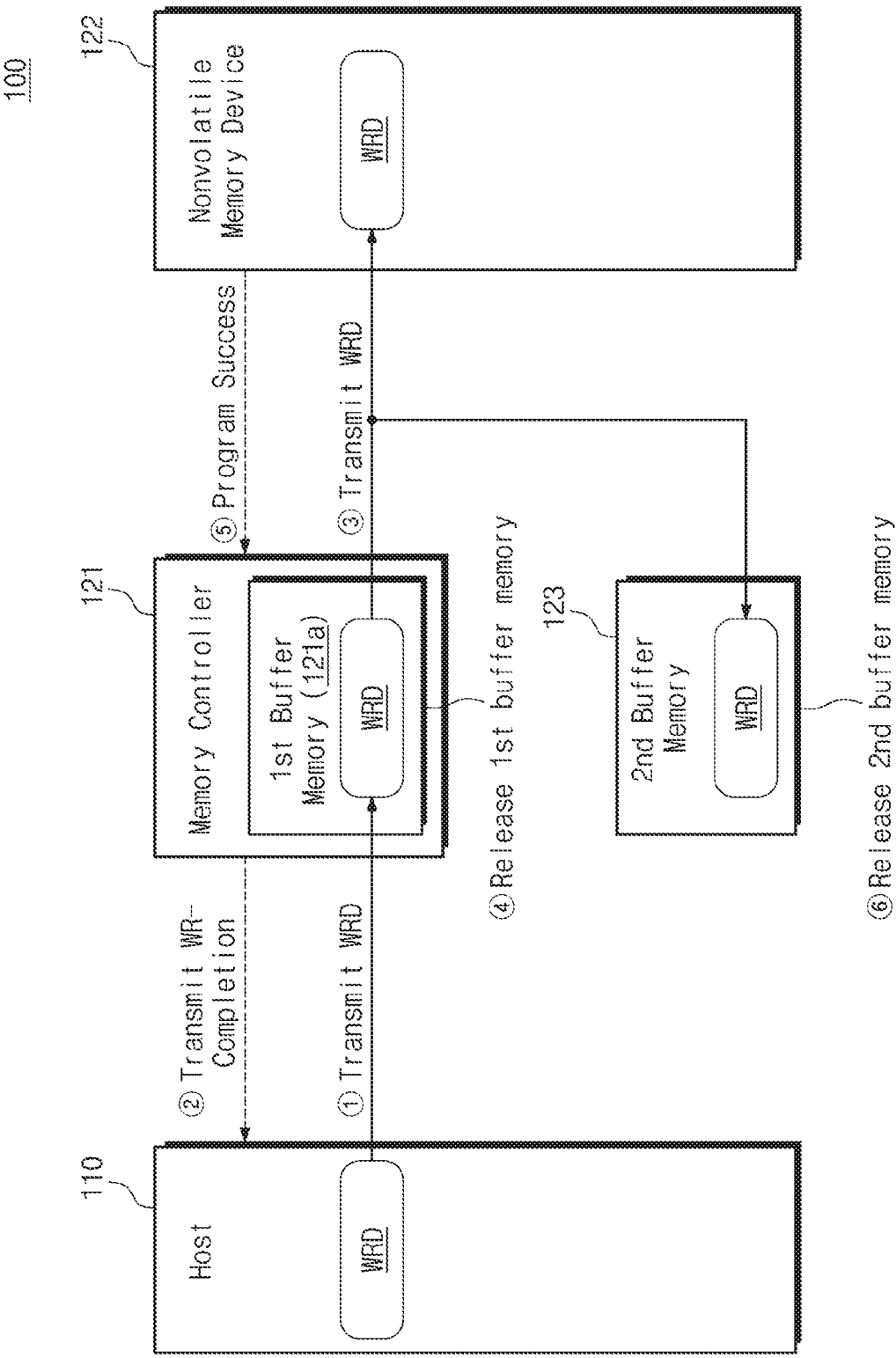

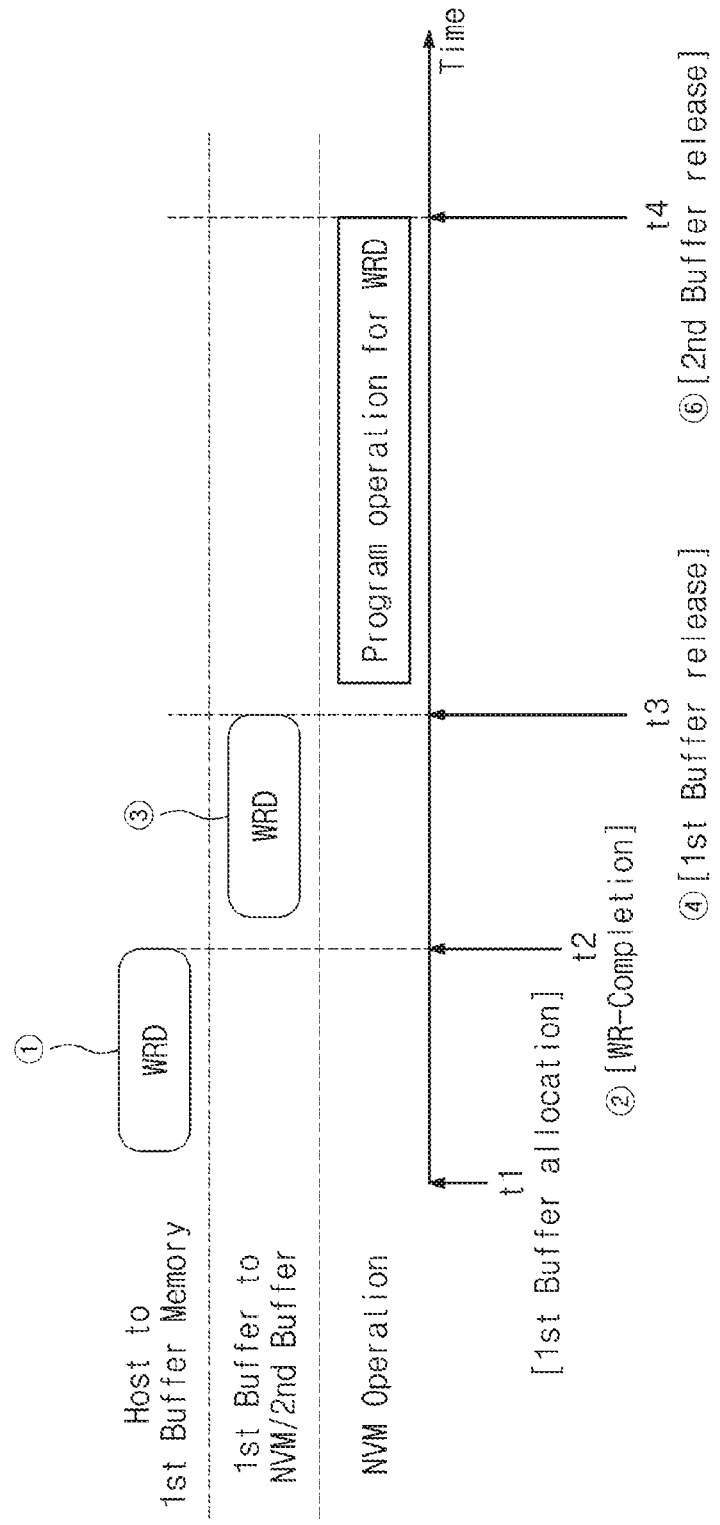

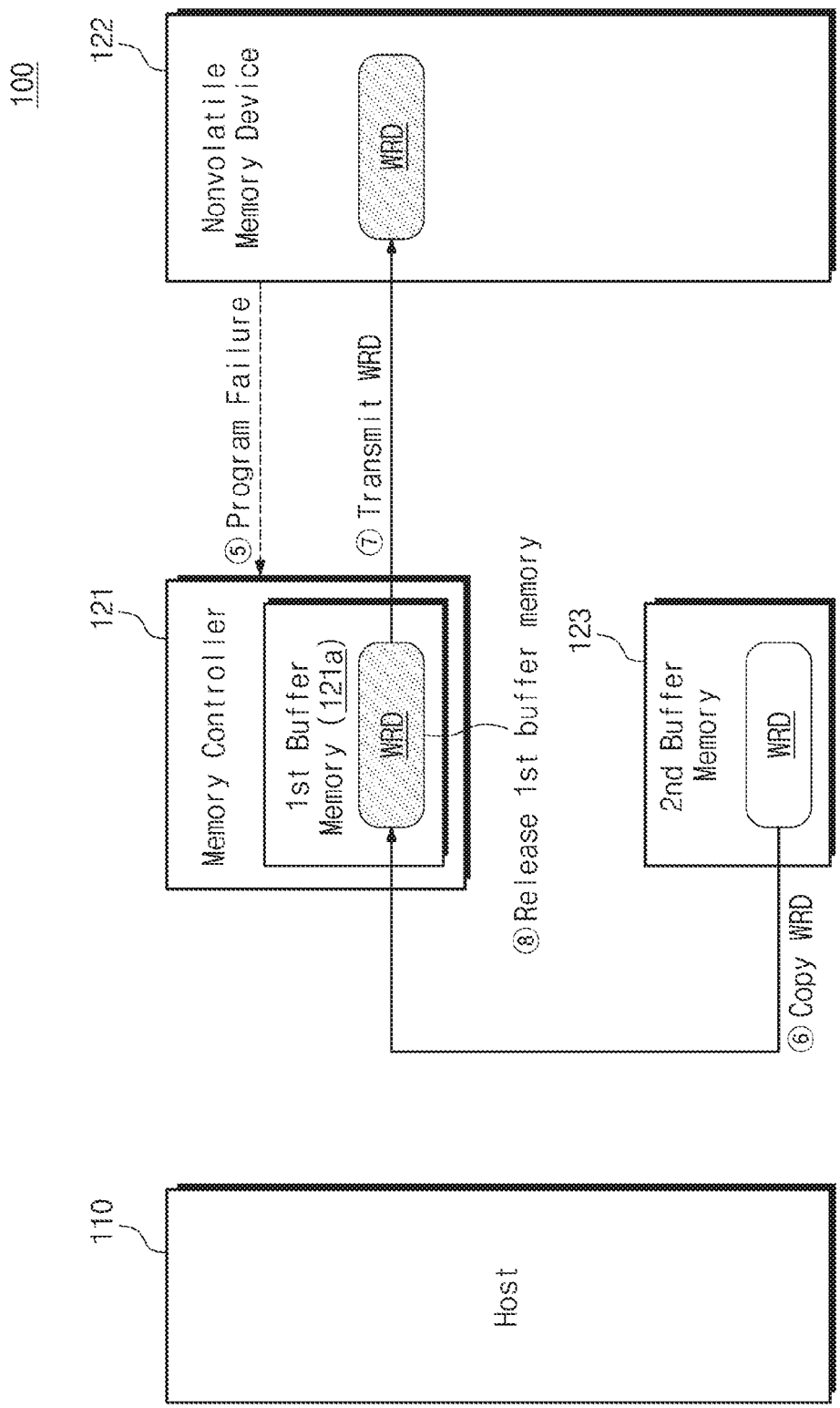

MEMORY SYSTEM, MEMORY CONTROLLER FOR MEMORY SYSTEM, OPERATION METHOD OF MEMORY CONTROLLER, AND OPERATION METHOD OF USER DEVICE INCLUDING MEMORY DEVICE

CROSS-REFERENCE TO RELATED APPLICATIONS

A claim for priority under 35 U.S.C. § 119 is made to Korean Patent Application No. 10-2017-0084198 filed on Jul. 3, 2017 in the Korean Intellectual Property Office, the entire contents of which are hereby incorporated by reference.

BACKGROUND

Embodiments of the inventive concept described herein relate to a semiconductor memory, and more particularly, to a memory system, a memory controller for a memory system, an operation method of a memory controller, and an operation method of a user device including a memory system.

Semiconductor memories are classified into volatile memory devices in which stored data disappear when power is interrupted and nonvolatile memory devices in which stored data are retained even when power is interrupted.

A flash memory device, which is a type of nonvolatile memory device, is widely used as a mass storage medium of a user device. As computing technology develops, there is a continual demand for improvement in the performance of a flash memory based mass storage medium. For example, the flash memory based mass storage medium uses a high-speed buffer memory such as a random access memory to make up for a difference between input/output speeds of a host and the storage medium. However, there is a limitation on improvement in performance due to factors such as a limited capacity of the high-speed buffer memory or limitations in the ability to guarantee the reliability of data to be stored in a flash memory.

SUMMARY

Embodiments of the inventive concept provide an operation method of a memory controller and an operation method of a user device which may improve performance and reliability of stored data.

In one aspect, a system comprises: a nonvolatile memory; a memory controller configured to control the nonvolatile memory, the memory controller including a first buffer memory for temporarily storing write data to be written to the nonvolatile memory; and a second buffer memory having a lower operational speed and a higher memory capacity than the first buffer memory, the memory controller being configured to transmit the write data from the first buffer memory to the second buffer memory and to the nonvolatile memory, and to release an operational state of the first buffer memory after transmitting the write data from the first buffer memory to the second buffer memory and to the nonvolatile memory, wherein writing additional write data to the first buffer memory is prohibited prior to the release of the operational state of the first buffer memory, and writing the additional write data to the first buffer memory is permitted after the release of the operational state of the first buffer memory.

In another aspect, a memory system comprises: a nonvolatile memory; a memory controller comprising a write buffer for temporarily storing write data to be stored in the nonvolatile memory, the memory controller being configured to transmit the write data from the write buffer to the nonvolatile memory; and a random access memory (RAM) which is arranged to back up the write data transmitted to the nonvolatile memory by the memory controller, wherein the memory controller is configured to release an operational state of the write buffer while the write data is backed up in the RAM and prior to confirmation of a successful write of the write data transmitted to the nonvolatile memory, and wherein writing of additional write data to the write buffer is prohibited prior to the release of the operational state of the write buffer, and writing of the additional write data to the write buffer is permitted after the release of the operational state of the write buffer.

In a further aspect, a memory system comprises: a nonvolatile memory; a memory controller comprising a write buffer for temporarily storing write data to be stored in the nonvolatile memory, the memory controller being configured to transmit the write data from the write buffer to the nonvolatile memory; and the memory controller further being configured to release an operational status of the write buffer prior to confirmation of a successful write of the write data transmitted to the nonvolatile memory, wherein writing additional write data to the write buffer memory is prohibited prior to the release of the operational state of the write buffer, and writing of the additional write data to the write buffer is permitted after the release of the operational state of the write buffer.

In yet another aspect, a system comprises: a memory device including nonvolatile memory and a memory controller configured to control the nonvolatile memory, the memory controller including a first buffer memory; and a host device including a second buffer memory, the host device being configured to transmit write data to the memory device for storage in the nonvolatile memory, wherein the memory controller is configured to temporarily store the write data received from the host in the first buffer memory, and wherein the write data is backed up in the second buffer memory prior to confirmation of a successful write of the write data in the nonvolatile memory, wherein an operational state of the first buffer memory is released before confirmation of the successful write of the write data to the nonvolatile memory, and wherein writing of additional write data to the first buffer memory is prohibited prior to the release of the operational state of the first buffer memory, and writing of the additional write data to the first buffer memory is permitted after the release of the operational state of the first buffer memory.

In a still further aspect, a method comprises: a first buffer memory of a memory controller temporarily storing write data to be written; the memory controller transmitting the write data from the first buffer memory to a nonvolatile memory and to a second buffer memory having a lower operational speed and a higher memory capacity than the first buffer memory; and the memory controller releasing an operational state of the first buffer memory after transmitting the write data from the first buffer memory to the second buffer memory and to the nonvolatile memory, wherein writing of additional write data to the first buffer memory is prohibited prior to the release of the operational state of the first buffer memory, and writing of the additional write data to the first buffer memory is permitted after the release of the operational state of the first buffer memory.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4, FIG. 5 and FIG. 6 are views for describing embodiments of operation methods of the memory controller of FIG. 1 in detail.

DETAILED DESCRIPTION

Below, embodiments of the inventive concept may be described in detail and clearly to such an extent that an ordinary one in the art easily implements the inventive concept.

Figure 1:
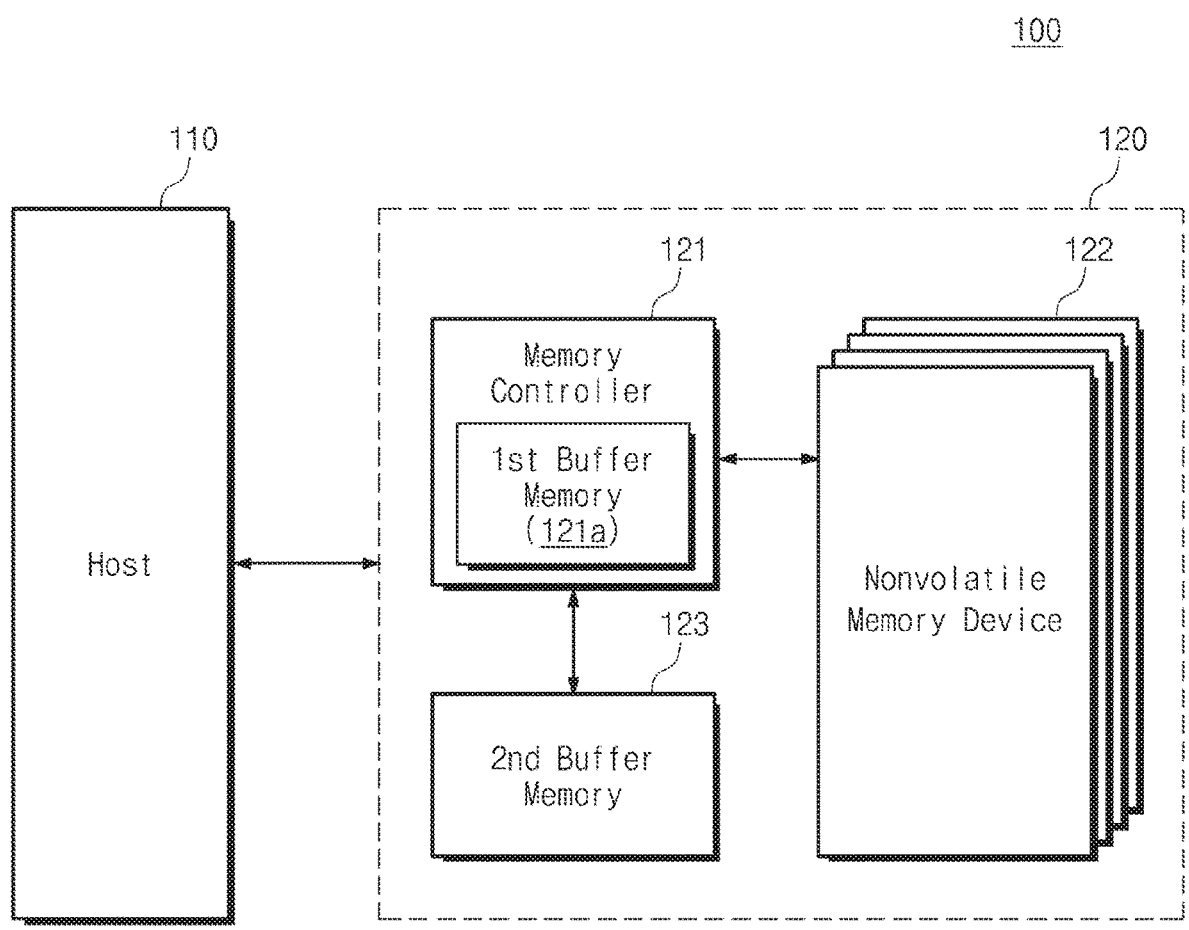
FIG. 1 is a block diagram illustrating an embodiment of a user system.

FIG. 1 is a block diagram illustrating an embodiment of a user system 100. Referring to FIG. 1, user system 100 may include a host device (host 110) and a storage device 120. User system 100 may be a computing system or an information processing system, such as a computer, a notebook, a server, a workstation, a portable communication terminal, a personal digital assistant (PDA), a portable multimedia player (PMP), a smartphone, or a wearable device.

On the basis of a specified interface, host 110 may store data in storage device 120 or may read data stored in storage device 120. In an embodiment, the interface may include at least one of various communication interfaces such as, but not limited to, a double data rate (DDR) interface, a universal serial bus (USB) interface, a multimedia card (MMC) interface, an eMMC (embedded MMC) interface, a peripheral component interconnection (PCI) interface, a PCI-express (PCI-E) interface, an advanced technology attachment (ATA) interface, a serial-ATA interface, a parallel-ATA interface, a small computer small interface (SCSI), an enhanced small disk interface (ESDI), an integrated drive electronics (IDE) interface, a firewire interface, an universal flash storage (UFS) interface, and a nonvolatile memory express (NVMe) interface.

Storage device 120 may include a memory controller 121, nonvolatile memory devices 122, and a second buffer memory 123. In an embodiment, storage device 120 may be a mass storage medium of user system 100, such as a solid state drive (SSD), a USB memory, a hard disk drive, or a USB stick.

Under control of host 110, memory controller 121 may store data in nonvolatile memory devices 122 or may read data stored in nonvolatile memory devices 122. Memory controller 121 may include a first buffer memory 121a. First buffer memory 121a may temporarily store data to be stored in nonvolatile memory devices 122 or data read from nonvolatile memory devices 122. That is, first buffer memory 121a may be used as a write buffer or a read buffer of storage device 120.

Under control of memory controller 121, nonvolatile memory devices 122 may store data or may output data stored therein. In an embodiment, each of nonvolatile memory devices 122 may include a NAND flash memory. However, embodiments of the inventive concept are not limited thereto. For example, each of nonvolatile memory devices 122 may include a nonvolatile memory such as a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a ferroelectric RAM (RRAM), or a ferroelectric RAM (FRAM).

Second buffer memory 123 may store a variety of information needed for storage device 120 to operate. For example, second buffer memory 123 may store information such as a mapping table used in a flash translation layer (FTL) of memory controller 121. Also, second buffer memory 123 may be configured to temporarily store write data to be stored in nonvolatile memory devices 122. In an embodiment, second buffer memory 123 may be implemented with a semiconductor die, chip, package, or module that is independent of memory controller 121 or may be implemented with the same semiconductor die, chip, package, or module as memory controller 121. In an embodiment, second buffer memory 123 may have a storage capacity that is larger than first buffer memory 121a.

According to an embodiment of the inventive concept, storage device may release first buffer memory 121a used as a write buffer and transmit a write completion to host 110 prior to successfully programming the write data in nonvolatile memory devices 222, thus minimizing a delay associated with a write request from host 110 and securing an available capacity of first buffer memory 121a.

For example, storage device 120 may temporarily store write data from host 110 in first buffer memory 121a of memory controller 121. Storage device 120 may release first buffer memory 121a after transmitting the write data stored in first buffer memory 121a to nonvolatile memory devices 122 and to second buffer memory 123, thus securing an available capacity of first buffer memory 121a. In this case, there may be a need to retain the write data stored in second buffer memory 123 until the write data are completely and successfully programmed in nonvolatile memory devices 122. Accordingly, even though a program failure occurs in nonvolatile memory devices 122, the reliability of data may be secured because the write data are restored by using second buffer memory 123. That is, first buffer memory 121a according to an embodiment of the inventive concept may be used as a write buffer, and second buffer memory 123 may be used as a backup buffer or a logging buffer. In some embodiments, second buffer memory 123 may be dynamic random access memory (DRAM), and entire DRAM bandwidth of second buffer memory 123 may be used to transmit the write data from first buffer memory 121a to second buffer memory 123.

During a program operation, a conventional storage device secures the reliability of data by retaining data stored in a write buffer until programming of nonvolatile memory devices is successfully completed or by transmitting write completion to a host after the programming of the nonvolatile memory devices is successfully completed. However, in the case where a capacity of the write buffer is insufficient, the write performance may decrease, and a write delay may increase because a point in time when the write completion is sent is delayed.

However, storage device 120 according to an embodiment of the inventive concept may secure an available capacity of first buffer memory 121a used as a write buffer by releasing the write buffer in advance regardless of successful completion of programming nonvolatile memory devices 122 and may prevent a write delay by transmitting write completion to host 110 in advance of successful completion of programming nonvolatile memory devices 122. In an embodiment, write data may be retained in second buffer memory 123 until programming of nonvolatile memory devices 122 is successfully completed, thereby securing the reliability of data in a program failure situation.

Accordingly, it may be possible to secure both a sufficient available space of the write buffer and the reliability of write data in a DRAM-less storage device or a storage device having a small write buffer. That is, storage device 120 according to an embodiment of the inventive concept may provide improved reliability and performance. An operation of storage device 120 according to an embodiment of the inventive concept will be more fully described with reference to the following drawings.

Figure 2:
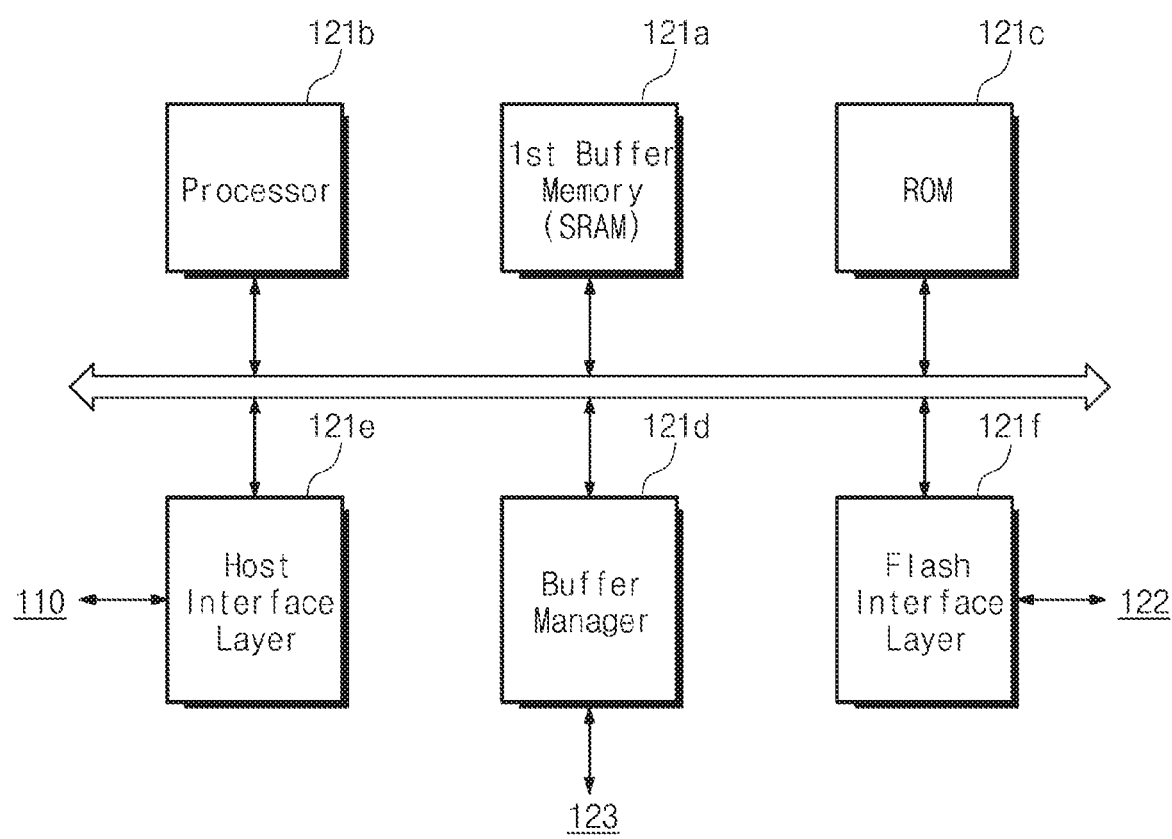
FIG. 2 is a block diagram illustrating a memory controller of FIG. 1.

FIG. 2 is a block diagram illustrating memory controller 121 of FIG. 1 in detail. Referring to FIGS. 1 and 2, memory controller 121 may include first buffer memory 121a, a processor 121b, a ROM 121c, a buffer manager 121d, a host interface layer 121e, and a flash interface layer 121f.

As described with reference to FIG. 1, first buffer memory 121a may be used as a write buffer or a read buffer of storage device 120. For example, first buffer memory 121a may be configured to temporarily store write data from host 110 or read data read from nonvolatile memory devices 122. In an embodiment, first buffer memory 121a may include a static random access memory (SRAM). However, embodiments of the inventive concept may not be limited thereto. For example, first buffer memory 121a may include a random access memory such as a dynamic RAM (DRAM), a synchronous DRAM (SDRAM), a PRAM, an MRAM, a resistive RAM, an FRAM, etc.

Processor 121b may control overall operations of memory controller 121. For example, processor 121b may be configured to drive firmware, program code, a software layer, etc. needed for memory controller 121 to operate or to control various hardware elements included in memory controller 121. ROM 121c may store a variety of information that is needed for memory controller 121 to operate in the form of firmware. In an embodiment, processor 121b may be configured to drive firmware stored in ROM 121c.

Buffer manager 121d may be configured to control second buffer memory 123. For example, second buffer memory 123 may include a DRAM, and buffer manager 121d may be a DRAM controller that is configured to write data in second buffer memory 123 or to read data stored in second buffer memory 123. In an embodiment, buffer manager 121d may be omitted, depending on a structure of memory controller 121 or second buffer memory 123.

Memory controller 121 may be configured to communicate with host 110 through host interface layer 121e. Host interface layer 121e may include at least one of specified interfaces described with reference to FIG. 1. Memory controller 121 may be configured to communicate with nonvolatile memory devices 122 through flash interface layer 121f.

Figure 3A:
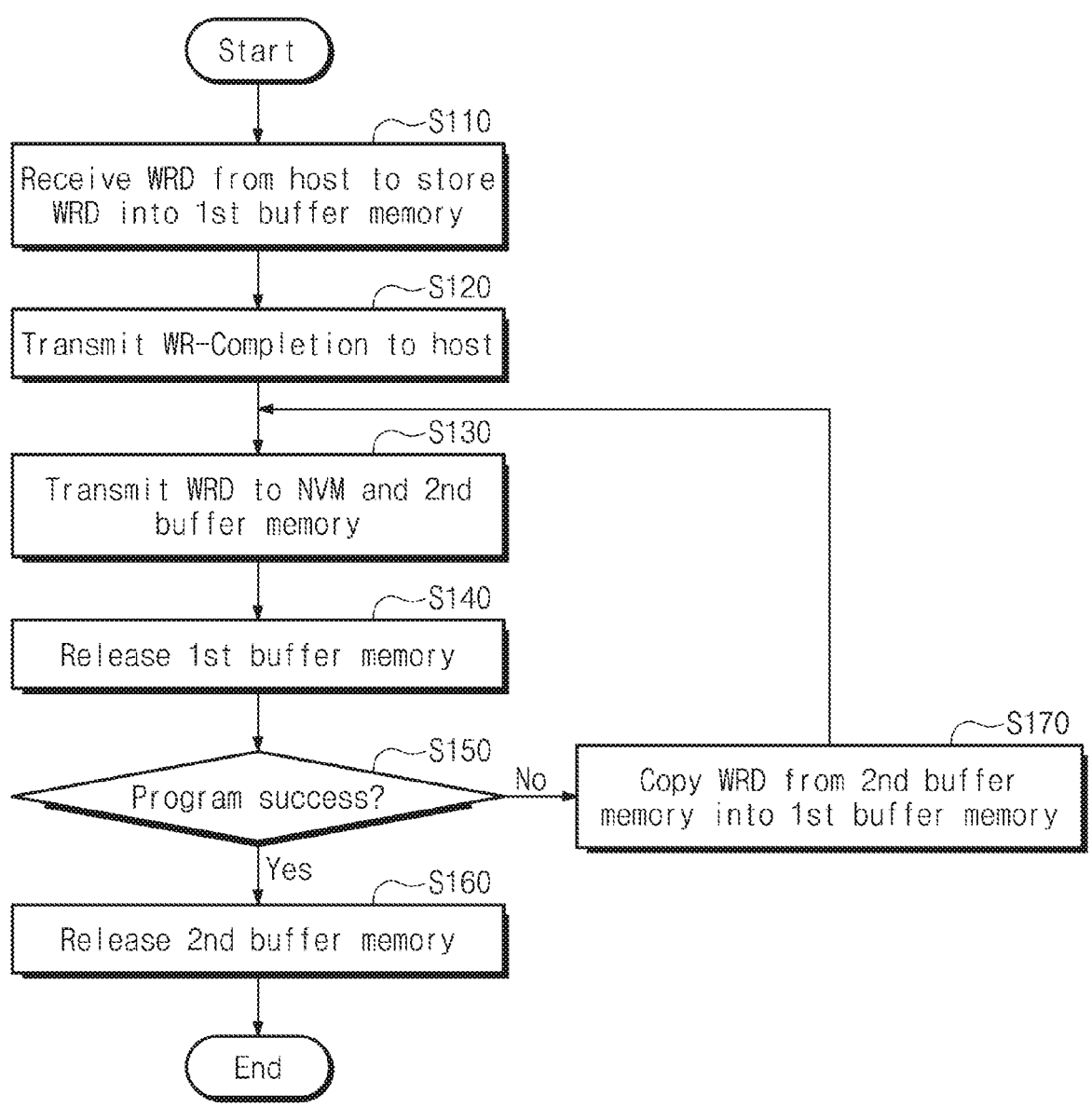
FIG. 3A and FIG. 3B are flowcharts illustrating embodiments of operation methods of the memory controller of FIG. 1.
Figure 3B:
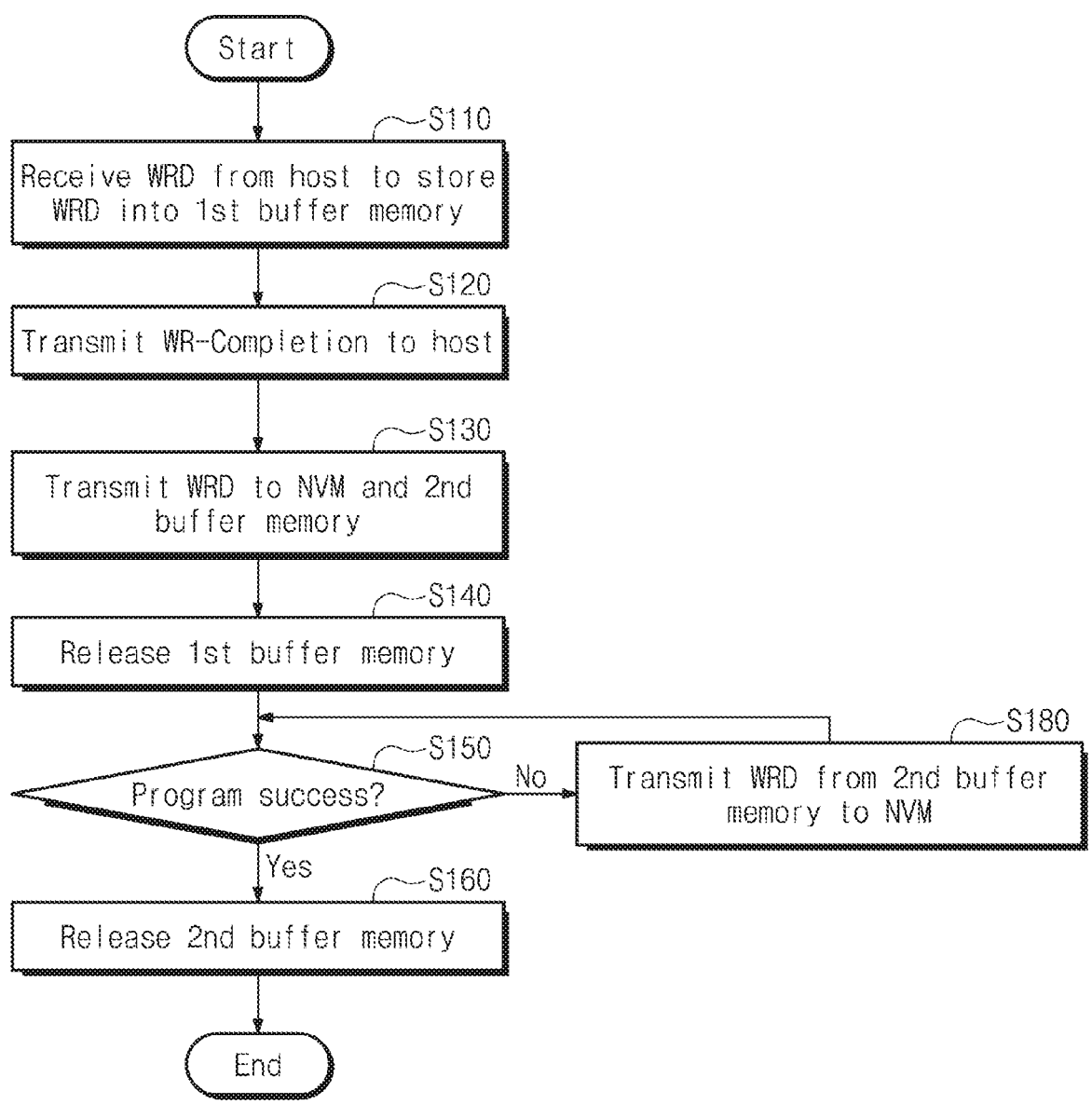

FIGS. 3A and 3B are flowcharts illustrating embodiments of operation methods of memory controller 121 of FIG. 1. Below, for a brief description, embodiments of the inventive concept will be described on the basis of a write operation of storage device 120. However, embodiments of the inventive concept may not be limited thereto. For example, the scope and spirit of the inventive concept may be applied to various operations.

Below, for a brief description, an operation of memory controller 121 will be described on the basis of one write data unit. For example, memory controller 121 may receive one write data WRD from host 110 and may transmit the received write data WRD to nonvolatile memory devices 122. However, embodiments of the inventive concept may not be limited thereto. For example, a data transfer unit between host 110 and memory controller 121 may be different from a data transfer unit between memory controller 121 and nonvolatile memory devices 122.

Below, "that first buffer memory 121a or second buffer memory 123 is released" may refer to a state where different write data are able to be stored in an area of first buffer memory 121a in which write data are already stored or in an area of second buffer memory 123 in which the write data are already stored. That is, in the case where there is released first buffer memory 121a in which write data are stored, different write data may be stored in first buffer memory 121a (in detail, an area, in which the write data are stored, from among areas of first buffer memory 121a) in which the write data are stored, or first buffer memory 121a (or the area thereof) may be allocated such that different write data are stored. In an embodiment, the release or allocation of the buffer memory may be performed by processor 121b of memory controller 121 or any other separate hardware element or any other software element of memory controller 121.

Below, for a brief description, data or information may be described as being simply exchanged between elements. However, embodiments of the inventive concept may not be limited thereto. For example, data transfer and flow between elements may be made by a predefined protocol between the elements. The above-described assumptions are exemplified only to describe the scope and spirit of the inventive concept briefly and clearly without limitation thereto.

Referring to FIGS. 1 to 3A, in operation S110, memory controller 121 may receive write data WRD from host 110 and may store the received write data WRD in first buffer memory 121a. For example, as described above, first buffer memory 121a may be used as a write buffer that temporarily stores the write data WRD from host 110. Memory controller 121 may temporarily store the write data WRD from host 110 in first buffer memory 121a. In an embodiment, memory controller 121 may be configured to receive a write request (or write command) from host 110 and to allocate first buffer memory 121a, in which the corresponding write data will be stored, in response to the received write request.

In operation S120, memory controller 121 may transmit WR-completion to host 110. For example, memory controller 121 may store the write data WRD in first buffer memory 121a and may then transmit the WR-completion associated with the above-described write request to host 110. In an embodiment, host 110 that receives the WR-completion may recognize that a write operation corresponding to the issued write request is completed and may perform other operations (e.g., another write request, a read request, or other internal operations).

In operation 130, memory controller 121 may transmit the write data WRD to nonvolatile memory devices 122 and second buffer memory 123. For example, memory controller 121 may transmit the write data WRD to nonvolatile memory devices 122 such that the write data WRD stored in first buffer memory 121a are stored in nonvolatile memory devices 122. Nonvolatile memory devices 122 may perform a program operation on the received write data WRD.

In addition, memory controller 121 may transmit the write data WRD stored in first buffer memory 121a to second buffer memory 123. In an embodiment, the write data WRD stored in second buffer memory 123 may be used to restore data in a program failure situation of nonvolatile memory devices 122. In an embodiment, first buffer memory 121a may be implemented in the form of a dual-port memory or a multi-port memory to simultaneously transmit the write data WRD from first buffer memory 121a to nonvolatile memory devices 122 and to second buffer memory 123.

In operation S140, memory controller 121 may release first buffer memory 121a. For example, memory controller 121 may release first buffer memory 121a after transmitting the write data WRD to nonvolatile memory devices 122 and to second buffer memory 123. In this case, since first buffer memory 121a used as a write buffer is released, an available capacity of first buffer memory 121a may be secured. This may mean that memory controller 121 receives and stores other write data from host 110. That is, as first buffer memory 121a is released, the write delay due to a limited capacity of the write buffer may be prevented.

In operation S150, memory controller 121 may determine whether the write data WRD are successfully programmed in nonvolatile memory devices 122. For example, memory controller 121 may receive information about a program result (i.e., program success or failure), e.g. a write pass signal or a write fail signal, from nonvolatile memory devices 122. Memory controller 121 may determine whether the program operation is successful, based on the received information.

If it is determined that the program operation is successful, in operation S160, memory controller 121 may release second buffer memory 123, for example in response to a write pass signal received from nonvolatile memory devices 122 as a confirmation of a successful write of the write data transmitted to nonvolatile memory devices 122. For example, since the program operation being successful indicates that the write data WRD are normally stored in nonvolatile memory devices 122, second buffer memory 123 in which the write data WRD are stored may be released, thereby securing an available capacity of second buffer memory 123.

In the case where the program operation fails, in operation S170, memory controller 121 may copy the write data WRD stored in second buffer memory 123 to first buffer memory 121a (or may restore the write data WRD stored in first buffer memory 121a by using the write data WRD stored in second buffer memory 123), for example in response to a write fail signal received from nonvolatile memory devices 122. For example, since the program failure means that the write data WRD are not normally stored in nonvolatile memory devices 122, there may be a need for an additional operation of programming the write data WRD to nonvolatile memory devices 12. In this case, since first buffer memory 121a is previously released in operation S140, first buffer memory 121a may be in a state where the write data WRD are not stored therein. However, since the write data WRD are stored in second buffer memory 123 in operation S130, second buffer memory 123 may be in a state where the write data WRD are stored therein. Accordingly, memory controller 121 may again program the write data WRD after copying the write data WRD from second buffer memory 123 to first buffer memory 121a (or restoring the write data WRD).

Operations S130 to S150 may be performed after operation S170. In this case, since the write data WRD are previously stored in second buffer memory 123, there may be omitted an operation of transmitting the write data WRD to second buffer memory 123.

Next, referring to FIGS. 1, 2, and 3B, memory controller 121 may perform operation S110 to operation S160 which were described above with respect to FIG. 3A.

In the case where the program operation S150 fails, then in operation S180 memory controller 121 may directly transmit the write data WRD stored in second buffer memory 123 to nonvolatile memory devices 122.

For example, according to the embodiment of FIG. 3A, when a program operation fails, memory controller 121 may be configured to copy the write data WRD stored in second buffer memory 123 to first buffer memory 121a and then, to transmit the write data WRD from first buffer memory 121a to nonvolatile memory devices 122. In contrast, according to the embodiment of FIG. 3B, in the case where the program operation fails, memory controller 121 may be configured to directly transmit the write data WRD from second buffer memory 123 to nonvolatile memory devices 122. That is, restoring data in first buffer memory 121a may be omitted. Restoring data of first buffer memory 121a is exemplified for a brief description with respect to FIG. 3A. However, embodiments of the inventive concept may not be limited thereto. For example, restoring the write data WRD in first buffer memory 121a may be omitted, and the write data WRD may be directly transmitted from second buffer memory 123 to nonvolatile memory devices 122, as shown in FIG. 3B.

As described above, storage device 120 or memory controller 121 according to an embodiment of the inventive concept may in advance perform releasing of a write buffer and transmitting of write completion before nonvolatile memory devices 122 successfully completes a program operation, thereby preventing reduction in performance due to a limited buffer capacity or reduction in performance due to a delayed transfer of write completion. Also, even though a program operation fails in nonvolatile memory devices 122, the reliability of data may be secured because the write data WRD are restored from a separate buffer memory (i.e., second buffer memory 123).

FIGS. 4 to 6 are views for describing an operation method of memory controller 121 of FIG. 1 in detail. For a brief description, elements that are unnecessary to describe an operation of memory controller 121 will not be repeated here. FIG. 4 is a view for describing an operation of memory controller 121 and data flow in the case where a program operation succeeds. FIG. 5 is a timing diagram illustrating data flow in the case where a program operation succeeds. FIG. 6 is a view for describing an operation of memory controller 121 and data flow in the case where a program operation fails.

First, referring to FIGS. 4 and 5, host 110 may transmit the write data WRD to memory controller 121 (①). For example, at a point in time t1 of FIG. 5, memory controller 121 may allocate an area, in which the write data WRD will be stored, from among areas of first buffer memory 121a. In an embodiment, the allocation of first buffer memory 121a may be performed in response to a write request from host 110. Memory controller 121 may store the write data WRD in the allocated area.

After the write data WRD are stored in first buffer memory 121a, memory controller 121 may transmit WR-completion to host 110 (②). For example, at a point in time t2 of FIG. 5, the write data WRD may be completely transmitted from host 110, memory controller 121 may transmit the WR-completion to host 110. In an embodiment, when receiving the WR-completion, host 110 may recognize that a write (or program) operation associated with the write data WRD is completed.

Memory controller 121 may transmit the write data WRD to nonvolatile memory devices 122 and to second buffer memory 123 (③). For example, memory controller 121 may transmit the write data WRD to nonvolatile memory devices 122 such that the write data WRD are stored in nonvolatile memory devices 122. In addition, memory controller 121 may transmit the write data WRD to second buffer memory 123 such that the write data WRD are stored in second buffer memory 123. In an embodiment, nonvolatile memory devices 122 may receive the write data WRD and may perform a program operation on the received write data WRD.

In an embodiment, operations of transmitting the write data WRD to nonvolatile memory devices 122 and to second buffer memory 123 may be performed substantially at the same time as each other. This may mean that there is no need for an additional time due to the transmission of the write data WRD to second buffer memory 123.

Memory controller 121 may release first buffer memory 121a after transmitting the write data WRD to nonvolatile memory devices 122 and to second buffer memory 123 (④) so that first buffer memory 121 is in a released operation state. Here, writing additional write data to first buffer memory 121a is prohibited prior to the release of the operational state of first buffer memory 121a, and writing additional write data to first buffer memory 121a is permitted after the release of the operational state of first buffer memory 121a. For example, at a third point in time t3 of FIG. 5, the write data WRD may be completely transmitted from first buffer memory 121a to nonvolatile memory devices 122 and to second buffer memory 123, and memory controller 121 may release first buffer memory 121a such that other write data from host 110 are stored in first buffer memory 121a. That is, since first buffer memory 121a is released before the program operation of nonvolatile memory devices 122 is successfully completed, memory controller 121 may further receive other write data prior to a point in time when the program operation of nonvolatile memory devices 122 is successfully completed. This may mean that a write delay due to a limited buffer capacity is prevented. In an embodiment, additional write data may be written to a certain area of first buffer memory 121a even prior to the release of the operational state of first buffer memory 121a. For example, if the write data WRD is stored in a first area of first buffer memory 121a, while writing additional write data to first area of first buffer memory 121a is prohibited prior to the release of the operational state of the first area of first buffer memory 121a, writing additional write data to second area of first buffer memory 121a is performed even prior to the release of the operational state of the first area of first buffer memory 121a.

Afterwards, memory controller 121 may receive information about a program success from nonvolatile memory devices 122 (⑤). Memory controller 121 may release second buffer memory 123 (⑥) in response to receiving information about the program success. For example, at a fourth point in time t4 of FIG. 5, memory controller 121 may receive information about the program success from nonvolatile memory devices 122 and may release second buffer memory 123 in response to the received information. In an embodiment, the released area of second buffer memory 123 may be allocated to an area for storing (or backing up, logging, etc.) other write data.

Next, a method for restoring write data in the case of a program failure will be described with reference to FIG. 6. For a brief description, the operation and configuration described with reference to FIGS. 4 and 5 will not be repeated in FIG. 6 That is, it is assumed that memory controller 121 of FIG. 6 previously performs the operations ① to ④ described with reference to FIGS. 4 and 5. In other words, in the embodiment of FIG. 6, it is assumed that first buffer memory 121a is in a state where the write data WRD are not stored therein and second buffer memory 123 is in a state where the write data WRD are stored therein.

Referring to FIG. 6, memory controller 121 may receive information about a program failure from nonvolatile memory devices 122 (⑤). As described above, the information about the program failure being received from nonvolatile memory devices 122 indicates that the write data WRD are not normally stored in nonvolatile memory devices 122. In this case, there may be a need to additionally perform a program operation for the write data WRD.

Memory controller 121 may copy the write data WRD from second buffer memory 123 to first buffer memory 121a in response to the received information (i.e., the information about the program failure), (i.e., may restore the write data WRD). For example, as described above, first buffer memory 121a is in a state where the write data WRD are not stored therein, and second buffer memory 123 is in a state where the write data WRD are stored therein. Accordingly, memory controller 121 may restore the write date WRD by copying the write data WRD from second buffer memory 123 to first buffer memory 121a.

Afterwards, memory controller 121 may transmit the write data WRD of first buffer memory 121a to nonvolatile memory devices 122 (⑦). Memory controller 121 may release first buffer memory 121a after transmitting the write data WRD to nonvolatile memory devices 122 (⑧).

In an embodiment, second buffer memory 123 may be released after a program operation of nonvolatile memory devices 122 is successfully performed. In other words, the write data WRD stored in second buffer memory 123 may be retained until the write data WRD are completely programmed in nonvolatile memory devices 122.

As described above, even though first buffer memory 121a used as a write buffer is released before program completion of nonvolatile memory devices 122, memory controller 121 may secure the reliability of data by using the write data WRD stored in second buffer memory 123.

Although not illustrated in FIG. 6, in the case where the program operation fails, in an embodiment memory controller 121 may be configured to directly transmit the write data WRD from second buffer memory 123 to nonvolatile memory devices 122. In other words, in the case where a program operation fails, memory controller 121 may be configured to omit copying the write data WRD to first buffer memory 121a and to provide the write data WRD directly to nonvolatile memory devices 122 from second buffer memory 123.

In an embodiment, after first buffer memory 121a is released, the program failure may occur while new write data from host 110 are stored in first buffer memory 121a. In this case, memory controller 121 may be configured to directly transmit the write data WRD corresponding to the program failure from second buffer memory 123 to nonvolatile memory devices 122 such that the write data WRD corresponding to the program failure are first programmed. During the above-described operation, new write data may be retained in first buffer memory 121a, or first buffer memory 121a may not be released. Alternatively, memory controller 121 may perform a program operation on the write data WRD stored in second buffer memory 123 after first performing a program operation on the new write data. However, embodiments of the inventive concept may not be limited thereto. For example, write data may be programmed in various schemes without departing from the scope and spirit of the inventive concept.

Figure 7:
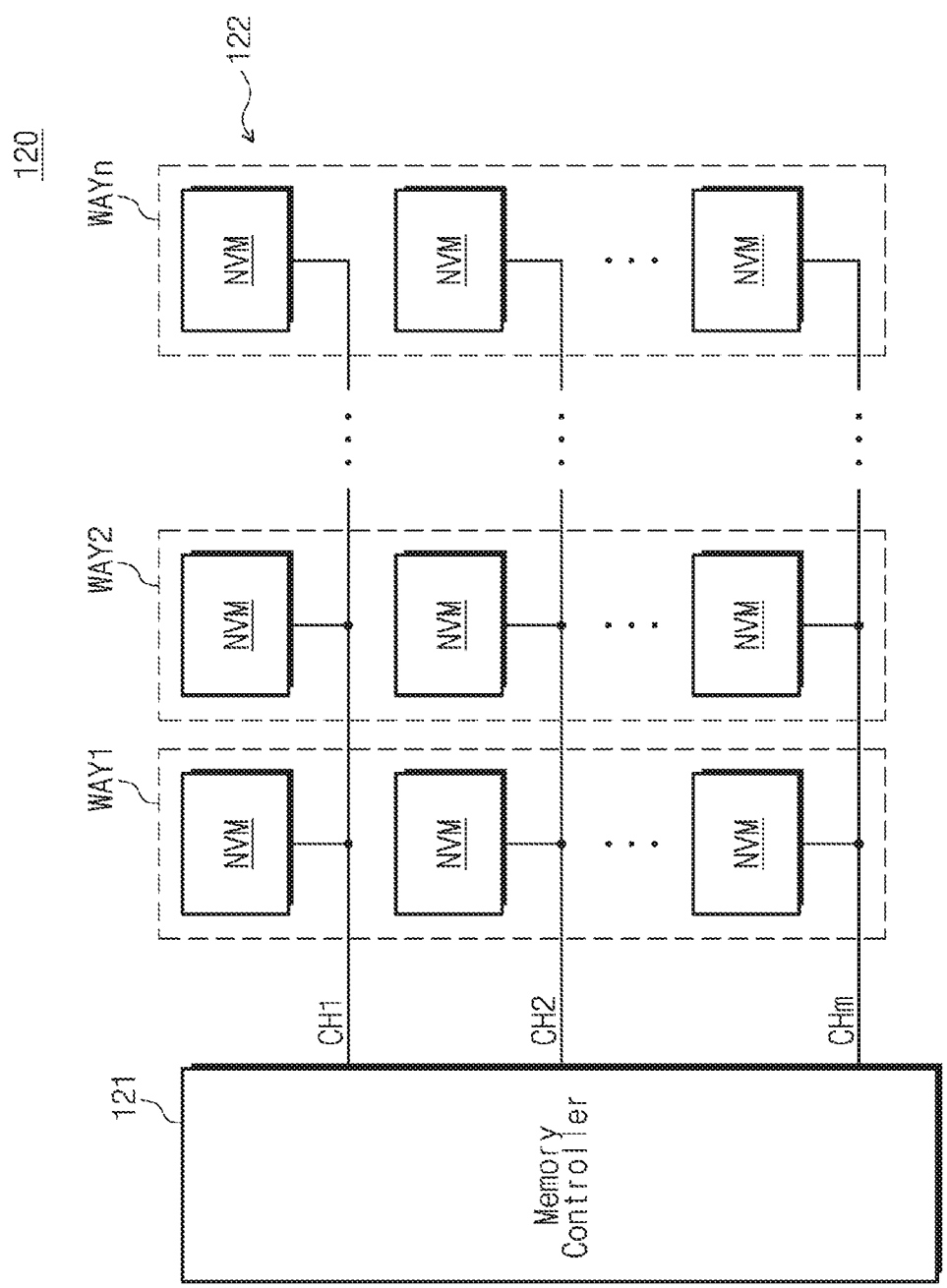
FIG. 7 and FIG. 8 are views illustrating a structure of a storage device of FIG. 1 and a structure of a second buffer memory of FIG. 1.
Figure 8:
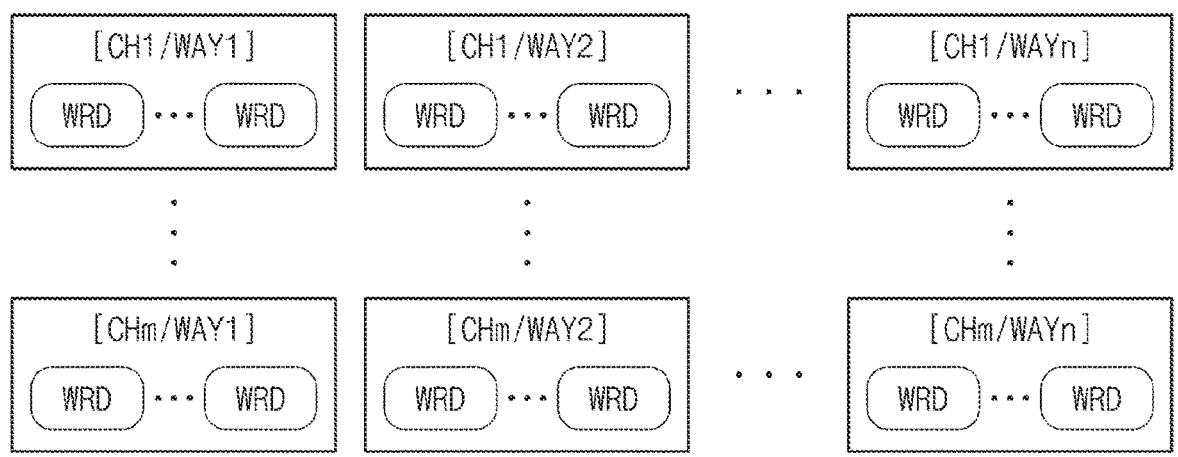

FIGS. 7 and 8 are views illustrating a structure of storage device 120 of FIG. 1 and a structure of second buffer memory 123 of FIG. 1. Referring to FIGS. 1, 7, and 8, storage device 120 may include memory controller 121 and the plurality of nonvolatile memory devices (NVMs) 122. Memory controller 121 and nonvolatile memory devices 122 are described with reference to FIGS. 1 to 6, and a detailed description thereof will not be repeated here.

Referring to FIGS. 7 and 8, memory controller 121 may respectively communicate with nonvolatile memory devices 122 through a plurality of channels CH1 to CHm. Nonvolatile memory devices 122 may be divided into a plurality of ways WAY1 to WAYn. For example, nonvolatile memory devices connected with the first channel CH1 may be respectively included in the first to n-th ways WAY1 to WAYn. Likewise, nonvolatile memory devices connected with each of the second to m-th channels CH2 to CHm may be respectively included in the first to n-th ways WAY1 to WAYn.

Alternatively, nonvolatile memory devices included in the first way WAY1 may be respectively connected with the plurality of channels CH1 to CHm, and nonvolatile memory devices included in the ways WAY2 to WAYn also may be respectively connected with the plurality of channels CH1 to CHm.

That is, nonvolatile memory devices 122 may be respectively implemented with a separate semiconductor die, chip, package, or module and may be distinguishable for each channel or for each way.

Second buffer memory 123 may be used as a storage area with regard to each of nonvolatile memory devices 122. For example, as illustrated in FIG. 8, second buffer memory 123 may be divided into a plurality of areas, which respectively correspond to the plurality of nonvolatile memory devices 122. In this case, each area may be distinguishable for each channel or way of nonvolatile memory devices 122 and may be configured to store write data to be stored in the corresponding nonvolatile memory devices 122. The storage areas illustrated in FIG. 8 may be physical or logical areas.

Figure 9:
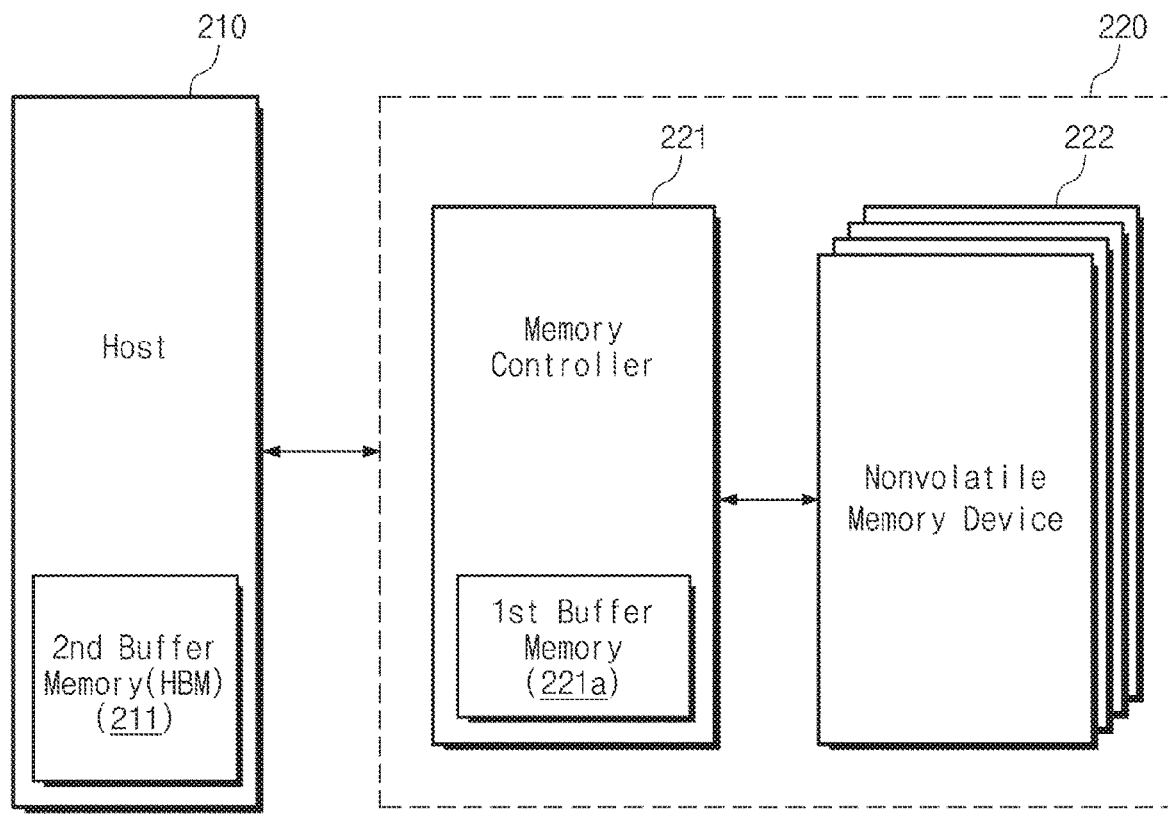
FIG. 9 is a block diagram illustrating an embodiment of a user system.

FIG. 9 is a block diagram illustrating an embodiment of a user system 200. For a brief description, a description that is given with reference to the above elements will not be repeated here. Referring to FIG. 9, user system 200 may include a host 210 and a storage device 220. Storage device 220 may include a memory controller 221 and nonvolatile memory devices 222. Memory controller 221 may include a first buffer memory 221a.

In the embodiment of FIG. 1, second buffer memory 123 is included in storage device 120. However, in the embodiment of FIG. 9, a second buffer memory 211 is included in host 210. In an embodiment, storage device 220 may use second buffer memory 211 included in host 210 as means for restoring write data when a program operation fails. In an embodiment, second buffer memory 211 may be a host buffer memory (HBM). That is, storage device 220 may make use of second buffer memory 211 (i.e., the host buffer memory) included in host 210.

Figure 10:
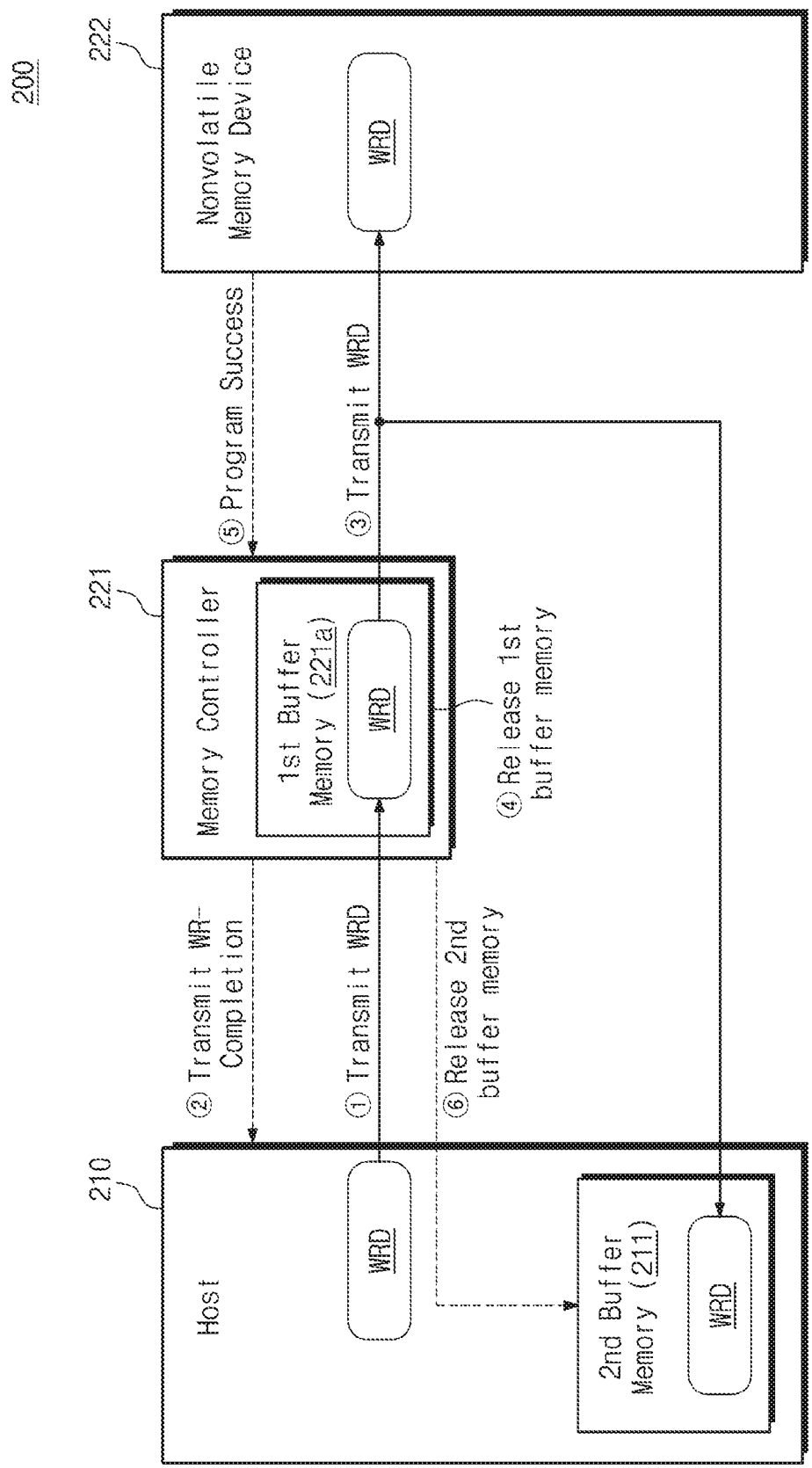
FIG. 10, FIG. 11 and FIG. 12 are views for describing an operation of a memory controller of FIG. 9.
Figure 11:
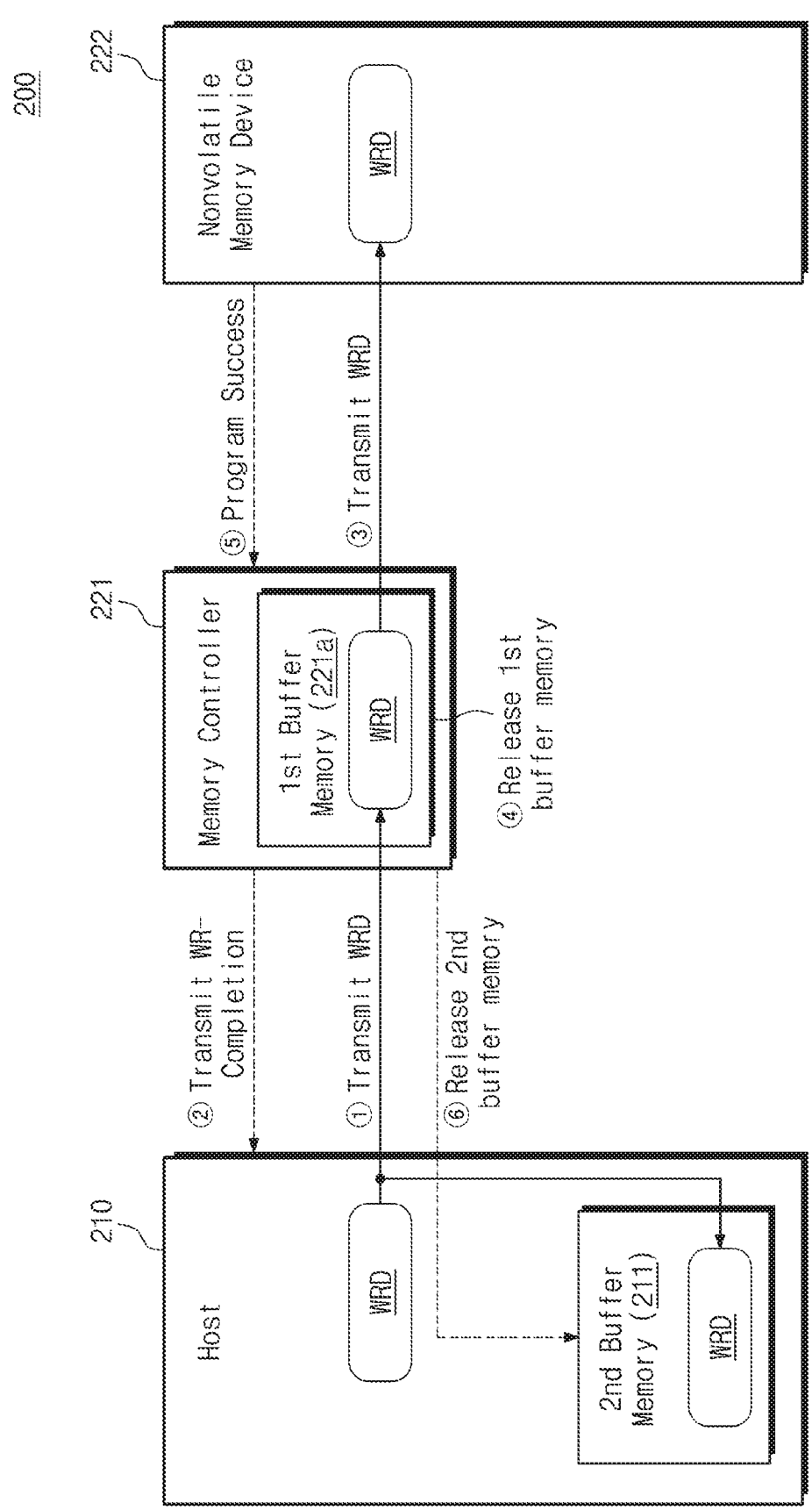
Figure 12:
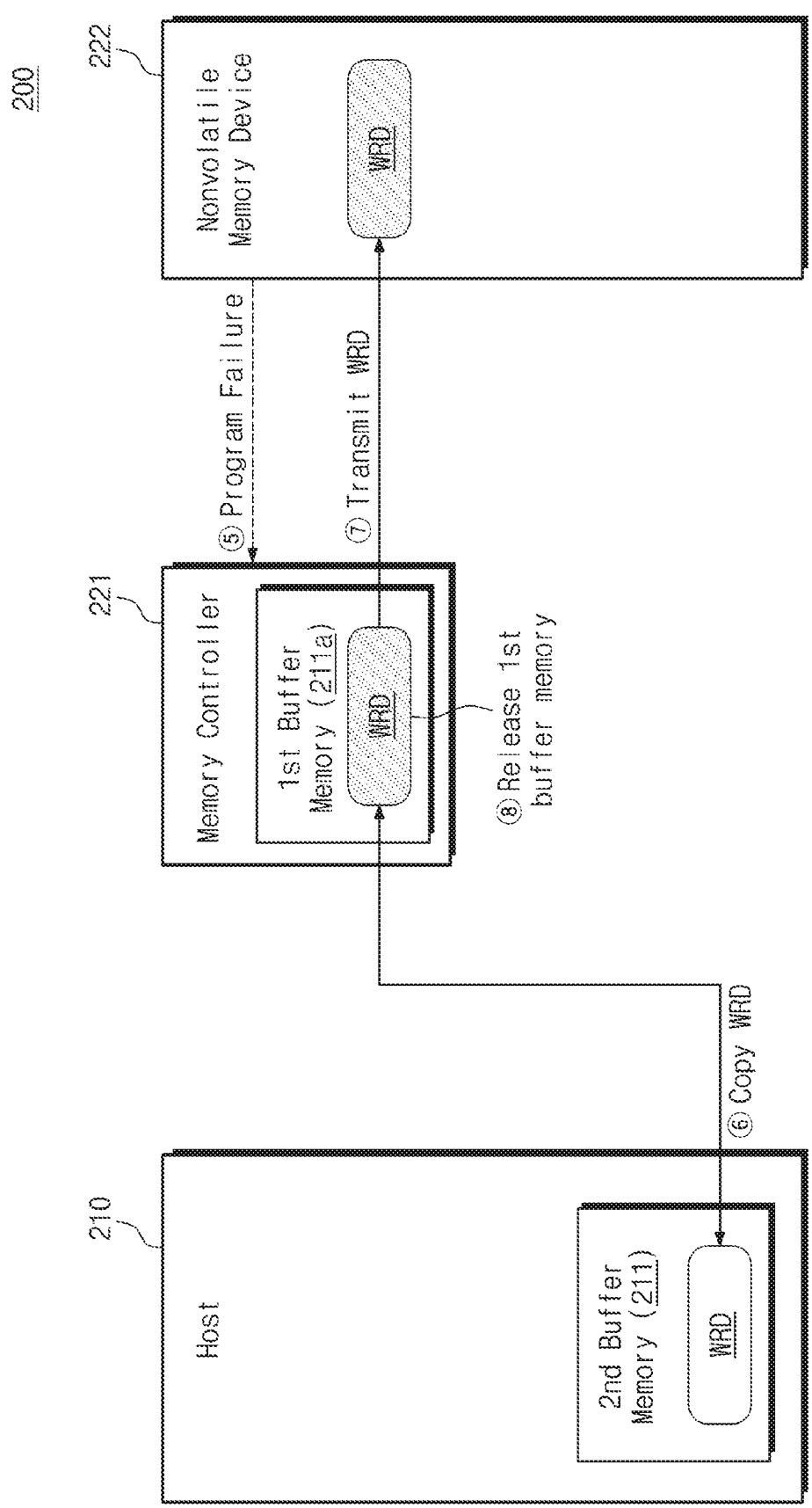

FIGS. 10 to 12 are views for describing an operation of memory controller 221 of FIG. 9. For a brief description, a detailed description of elements unnecessary to describe the operation of memory controller 221 and a description given with reference to the above elements will not be repeated here.

First, referring to FIG. 10, host 210 may transmit the write data WRD to first buffer memory 221a (①). After the write data WRD are stored in first buffer memory 221a, memory controller 221 may transmit WR-completion to host 210 (②). The operations ① and ② are similar to those described with reference to FIG. 4, and a description thereof will not be repeated here.

Afterwards, memory controller 221 may transmit the write data WRD of first buffer memory 221a to nonvolatile memory devices 222 and to second buffer memory 211 (③). The operation (write data transfer) ③ illustrated in FIG. 10 may be different from the operation ③ of FIG. 4. For example, in the operation (write data transfer) ③ of FIG. 4, buffer manager 121d (refer to FIG. 2) may transfer the write data WRD to second buffer memory 123. However, since second buffer memory 211 of FIG. 10 is the host buffer memory HBM included in host 210, in the operation (write data transfer) ③ of FIG. 10 the write data WRD may be transmitted to second buffer memory 211 through host interface layer 121e (refer to FIG. 2).

Afterwards, memory controller 221 may release first buffer memory 221a (④), may receive information about a program success from nonvolatile memory devices 222 (⑤), and may release second buffer memory 211 in response to the received information (⑥). In an embodiment, the releasing of second buffer memory 211 may be made through host interface layer 121e.

Next, referring to FIG. 11, host 210 may transmit the write data WRD to first buffer memory 221a (①). In this case, unlike the embodiment of FIG. 10, host 210 may transmit the write data WRD to second buffer memory 211. In other words, host 210 may store the write data WRD in second buffer memory 211 while transmitting the write data WRD to first buffer memory 221a. In an embodiment, host 210 may provide memory controller 221 with information about a pointer to an address or location of second buffer memory 211 at which the write data WRD are stored.

After the write data WRD are stored in first buffer memory 221a, memory controller 221 may transmit the WR-completion to host 210 (②). Afterwards, memory controller 221 may transmit the write data WRD of first buffer memory 221a to nonvolatile memory devices 222 (③). Since the write data WRD are stored in second buffer memory 211 by host 210, memory controller 221 may not transmit the write data WRD to second buffer memory 211.

Afterwards, memory controller 221 may perform operations ④, ⑤, and ⑥. The operations ④, ⑤, and ⑥ are described with reference to FIG. 10, and a description thereof will not be repeated here. In an embodiment, memory controller 221 may release second buffer memory 211 based on the pointer information associated with the write data WRD.

As described above, storage device 220 may use the host buffer memory HBM as a buffer memory for restoring write data when a program operation fails. In an embodiment, memory controller 221 of storage device 220 may access the host buffer memory HBM through a host interface layer including a predefined interface or protocol.

In the embodiment described with reference to FIG. 10, the write data WRD may be transmitted by memory controller 221 to second buffer memory 211 while being transmitted to nonvolatile memory devices 222. For this reason, a unit of the write data WRD to be transmitted in second buffer memory 211 may be a program unit (e.g., a unit of PGM-D, for example, 96 KB). In contrast, in the embodiment described with reference to FIG. 11, the write data WRD may be transmitted by host 210 to second buffer memory 211 while being transmitted to first buffer memory 221a. For this reason, a unit of the write data WRD to be transmitted in second buffer memory 211 may be a write data unit (i.e., a data transfer unit between host 210 and memory controller 221, for example, 4 KB).

Below, a data recovery method of storage device 220 when a program operation fails will be described with reference to FIG. 12. For a brief description, it is assumed that host 210 and memory controller 221 of FIG. 12 are in a state where the operations ①, ②, ③, and ④ of FIG. 10 or 11 are performed. That is, first buffer memory 221a of memory controller 221 may be in a state where the write data WRD are not stored therein, and second buffer memory 211 of host 210 may be in a state where the write data WRD are stored therein.

Referring to FIG. 12, memory controller 221 may receive information about a program failure from nonvolatile memory devices 222 (⑤). Memory controller 210 may copy the write data WRD from second buffer memory 211 of host 210 to first buffer memory 221a in response to the received information (or may restore the write data WRD) (⑥). In an embodiment, memory controller 221 may copy the write data WRD to first buffer memory 221a by accessing second buffer memory 211 of host 210 based on information about an area where the write data WRD corresponding to the program failure are stored. In an embodiment, the operation ⑥ may be performed through a host interface layer. In an embodiment, in the case where the write data WRD are stored in second buffer memory 211 by host 210, memory controller 221 may access second buffer memory 211 based on pointer information received from host 210, as described above.

Afterwards, memory controller 221 may transmit the write data WRD of first buffer memory 221a to nonvolatile memory devices 222 (⑦) and may release first buffer memory 221a (⑧).

As described above, storage device 220 according to an embodiment of the inventive concept may release a write buffer and may transmit a write completion before successful program completion, thereby preventing reduction in performance due to a limited buffer capacity or a write delay. Also, storage device 220 according to an embodiment of the inventive concept may use second buffer memory 211 (i.e., a host buffer memory) as means for restoring write data when a program operation fails, and thus the reliability of storage device 220 may be improved.

Figure 13:
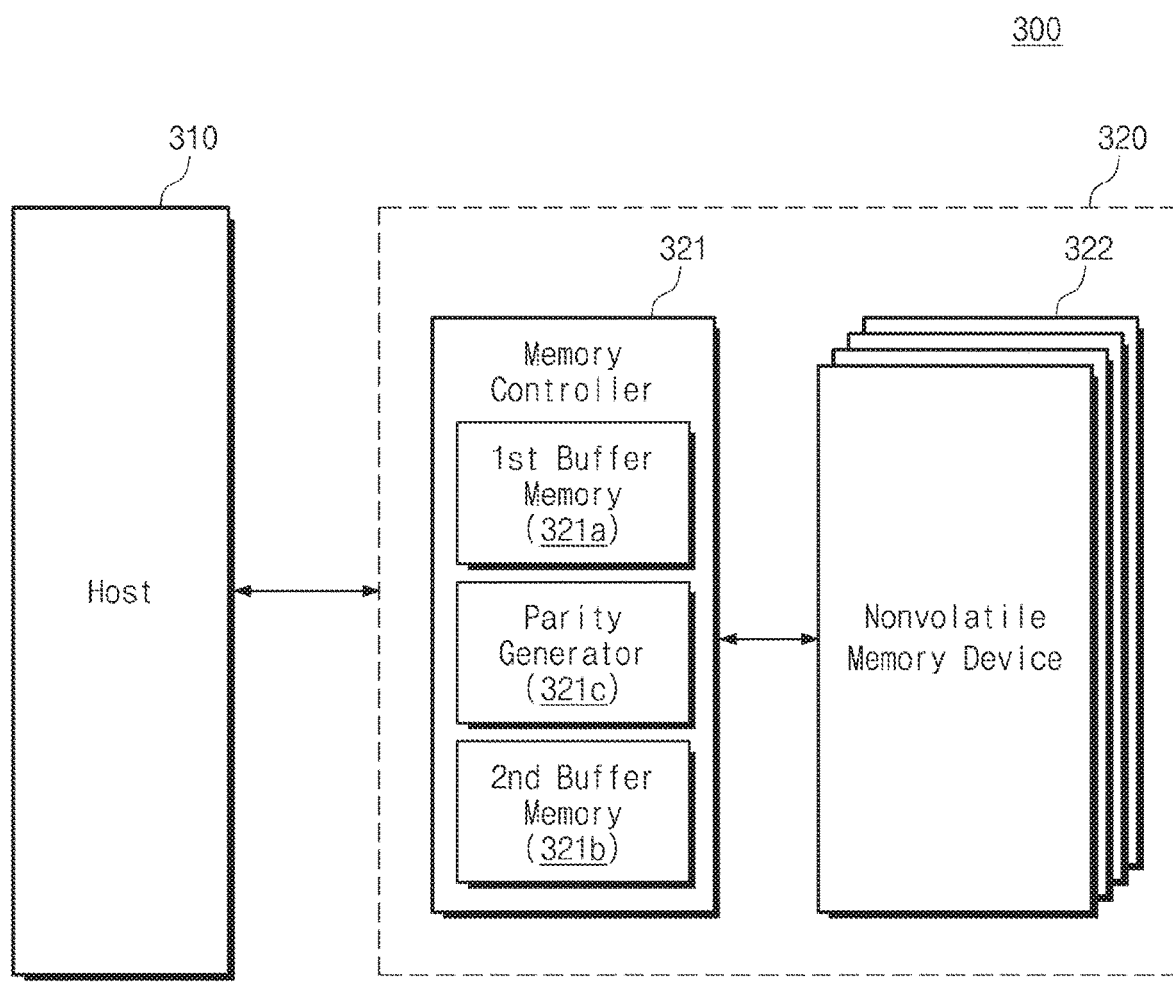
FIG. 13 is a block diagram illustrating an embodiment of a user system.

FIG. 13 is a block diagram illustrating an embodiment of a user system 300. For brevity's sake, a description that is in detail given with reference to the above elements will not be repeated here. Referring to FIG. 13, user system 300 may include a host 310 and a storage device 320. Storage device 320 may include a memory controller 321 and nonvolatile memory devices 322.

Memory controller 321 may include a first buffer memory 321a, a second buffer memory 321b, and a parity generator 321c. First buffer memory 321a may be used as a write buffer or a read buffer. First buffer memory 321a is described with reference to FIGS. 1 to 12, and a detailed description thereof will not be repeated here.

Second buffer memory 321b may be configured to store parity of write data to be stored in nonvolatile memory devices 322. In embodiments described above with reference to FIGS. 1 to 12, a second buffer memory may be configured to store the write data WRD itself. However, in the embodiment of FIG. 13, second buffer memory 321b may be configured to store parity of write data, not the write data itself. When a program operation fails, memory controller 321 may restore write data corresponding to the program failure based on the parity stored in second buffer memory 321b and the corresponding data stored in nonvolatile memory devices 322.

In an embodiment, second buffer memory 321b may be an SRAM included in memory controller 321. Second buffer memory 321b may be physically separated from first buffer memory 321a. Alternatively, first and second buffer memories 321a and 321b may be included in the same memory and may be logically distinguishable from each other. In an embodiment, although not illustrated in FIG. 13, second buffer memory 321b may be a separate memory (e.g., DRAM) that is provided outside memory controller 321.

Parity generator 321c may be configured to generate parity of one or more pieces of write data. For example, parity generator 321c may generate parity of one or more pieces of write data by a bitwise XOR operation on default parity and one or more pieces of write data. In an embodiment, parity generator 321c may generate parity of one or more pieces of data in an on-the-fly manner.

In an embodiment, the default parity may include all-zero bits, the length of which is the same as one write data unit or a program unit to be stored in nonvolatile memory devices 322, or may include data bits of a specific pattern. In an embodiment, the bitwise XOR operation for generating parity may be only an example, and an operation of parity generator 321c may not be limited thereto.

As described above, storage device 320 may prevent reduction in performance by performing transmitting of write completion and releasing of a write buffer before the write data are completely programmed. Also, storage device 320 may generate parity of one or more pieces of write data; when a program operation fails, storage device 320 may restore write data corresponding to the program failure based on the generated parity and the corresponding data. The operation of storage device 320 will be more fully described with reference to the following drawings.

Figure 14:
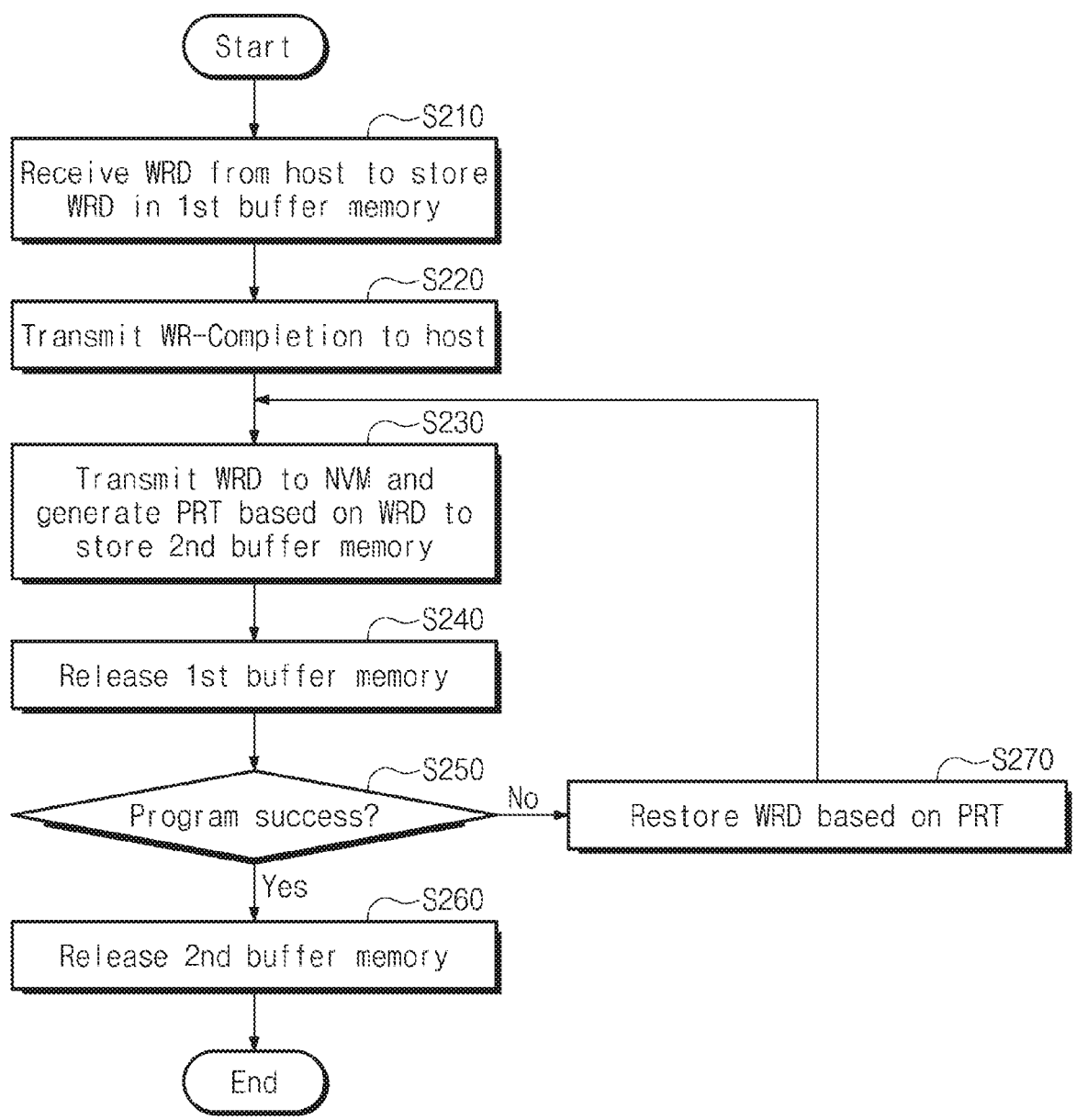
FIG. 14 is a flowchart illustrating an operation of a memory controller of FIG. 13.

FIG. 14 is a flowchart illustrating an operation of memory controller 321 of FIG. 13. Referring to FIGS. 13 and 14, memory controller 321 may perform operation S210 and operation S220. Operation S210 and operation S220 are similar to operation S110 and operation S120 of FIG. 3A, and a detailed description thereof will not be repeated here.

In operation 230, memory controller 321 may transmit the write data WRD to nonvolatile memory devices 322; memory controller 321 may generate parity PRT based on the write data WRD and may store the parity PRT in second buffer memory 321b. For example, as described above, memory controller 321 may transmit the write data WRD to nonvolatile memory devices 322 such that the write data WRD are stored in nonvolatile memory devices 322. In addition, memory controller 321 may generate the parity PRT based on the write data WRD and may store the parity PRT in second buffer memory 321b.

As a detailed example, memory controller 321 may read the parity PRT stored in second buffer memory 321b and may generate new parity by performing a bitwise XOR operation on the read parity PRT and the write data WRD. In an embodiment, the parity PRT stored in second buffer memory 321b may be default parity or parity of previous write data. That is, it may be possible to restore the write data WRD through a bitwise XOR operation with respect to previous write data and new parity. The new parity PRT thus generated is stored in second buffer memory 321b. In an embodiment, previous parity stored in second buffer memory 321b may be updated to the new parity PRT.

Afterwards, memory controller 321 may perform operation S240 to operation S260. Operation S240 to operation S260 may be similar to operation S140 to operation S160 of FIG. 3A, and a detailed description thereof will not be repeated here.

If the determination result of operation S250 indicates a program failure, in operation S270, memory controller 321 may restore the write data WRD based on the parity PRT stored in second buffer memory 321b. For example, as described above, the parity PRT stored in second buffer memory 321b may be parity associated with previous write data and the current write data WRD. That is, the current write data WRD may be restored by performing the bitwise XOR operation on the previous write data and the parity PRT. In an embodiment, to perform operation S250, memory controller 321 may read one or more pieces of previous write data from nonvolatile memory devices 322.

After the write data WRD are recovered, memory controller 321 may perform operation S230 to operation S250. In an embodiment, after the write data WRD are recovered, generating the parity PRT in operation S230 may be omitted.

As described above, storage device 320 according to an embodiment of the inventive concept may release a write buffer and transmit a write completion before successful program completion of nonvolatile memory devices 322, thereby preventing reduction in performance. Also, storage device 320 according to an embodiment of inventive concept may secure the reliability of write data by generating parity of the write data and maintaining the parity until a program operation of nonvolatile memory devices 322 is successfully completed.

Figure 15:
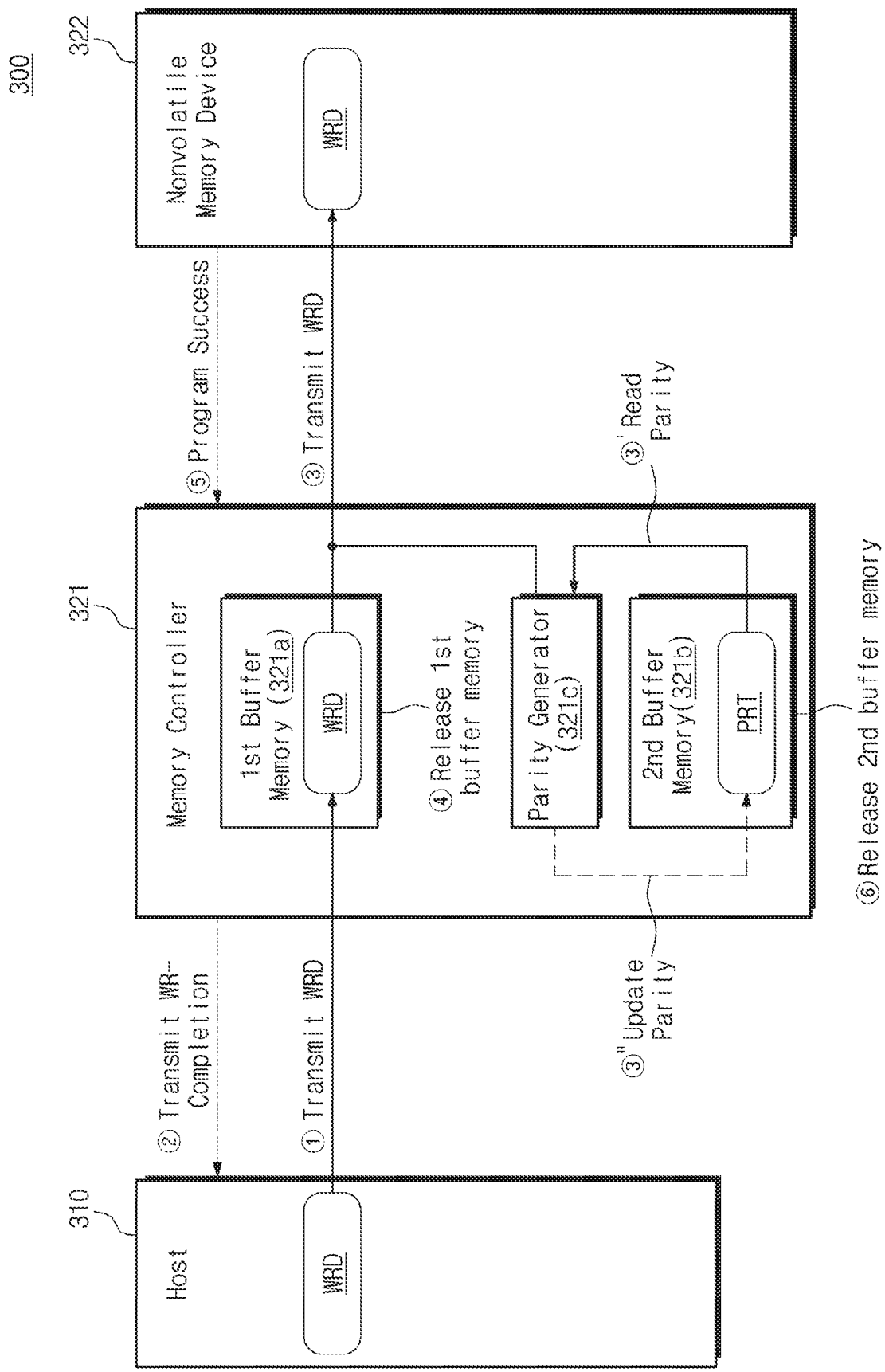
FIG. 15 is a view for describing an operation of the memory controller of FIG. 13.

FIG. 15 is a view for describing an operation of memory controller 321 of FIG. 13. For a brief description, elements that are unnecessary to describe an operation of memory controller 321 will not be repeated here. An operation of memory controller 321 when a program operation succeeds will be described with reference to FIG. 15.

Also, an operation of memory controller 321 will be described on the basis of one write data WRD. However, this is to describe embodiments briefly and clearly, and embodiments of the inventive concept may not be limited thereto. For example, memory controller 321 may be configured to transmit pieces of write data to nonvolatile memory devices 322 through a plurality of channels in an interleaving manner and to update parity whenever each of the pieces of write data is transmitted to nonvolatile memory devices 322. That is, memory controller 321 may be configured to generate, update, and manage individual parity with regard to pieces of write data.

Referring to FIG. 15, host 310 and memory controller 321 may perform operations ① and ②. The operations ① and ② are described with reference to FIG. 4, and a description thereof will not be repeated here. Afterwards, memory controller 321 may transmit the write data WRD to nonvolatile memory devices 322 and may update the parity PRT (③).

For example, memory controller 321 may transmit the write data WRD to nonvolatile memory devices 322. In addition, memory controller 321 may read the parity PRT from second buffer memory 321b (③') and may update the parity PRT of second buffer memory 321b to new parity generated on the basis of the read parity PRT and the write data WRD (③"). In an embodiment, the previous parity PRT stored in second buffer memory 321b may be default parity or parity of previous write data. In an embodiment, to secure the reliability of write data WRD, the transmitting of the write data WRD, the reading of the parity PRT (③'), and the updating of the parity PRT (③") may be made as an atomic operation.

After the transmitting of the write data WRD, the reading of the parity PRT (③'), and the updating of the parity PRT (③") are completed, memory controller 321 may release first buffer memory 321a.

Afterwards, memory controller 321 may receive information about a program success from nonvolatile memory devices 322 (⑤). Memory controller 321 may release second buffer memory 321b based on the received information. In an embodiment, the releasing of second buffer memory 321b may include changing the corresponding parity stored in second buffer memory 321b into default parity. The default parity stored in second buffer memory 321b may be used as default parity of new write data.

In an embodiment, although not illustrated clearly in FIG. 15, after pieces of write data are successfully programmed, second buffer memory 321b may be released, or parity stored in second buffer memory 321b may be changed into default parity. For example, memory controller 321 may generate individual parity associated with pieces of write data by repeating the above-described operations (the transmitting of the write data WRD, the reading of the parity PRT (③'), and the updating of the parity PRT (③")). In this case, memory controller 321 may be configured to release second buffer memory 321b after all pieces of write data are successfully programmed. In an embodiment, in the case where at least one of program operations of the pieces of write data fails, memory controller 321 may restore write data corresponding to the program failure based on the parity PRT and successfully programmed write data.

Figure 16:
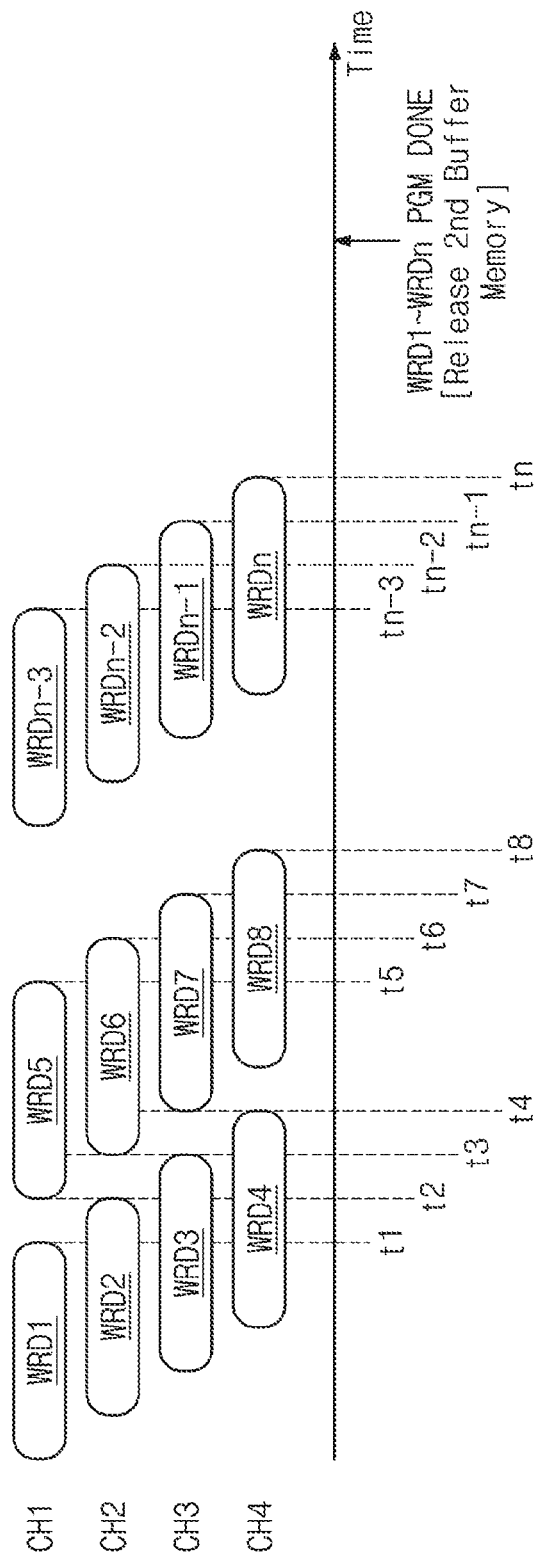
FIG. 16 is a timing diagram for describing how write data are transmitted to nonvolatile memory devices through a plurality of channels.

FIG. 16 is a timing diagram for describing how write data are transmitted to nonvolatile memory devices through a plurality of channels. For brevity of illustration and convenience of description, a configuration for receiving write data from host 310 and a program operation of nonvolatile memory devices 322 are not illustrated in FIG. 16, and only a configuration for transmitting, at memory controller 321, pieces of write data WRD1 to WRDn through first to fourth channels CH1 to CH4 are illustrated in FIG. 16. Also, it is assumed that memory controller 321 generates individual parity PRT based on each of the first to n-th write data WRD1 to WRDn.

However, embodiments of the inventive concept may not be limited thereto. For example, storage device 320 may communicate with additional nonvolatile memory devices through additional channels. Also, memory controller 321 may update the parity PRT whenever each of the write data WRD1 to WRDn is transmitted through the first to fourth channels CH1 to CH4.

Referring to FIGS. 13 and 15, the memory controller 321 may transmit the write data WRD1 to WRDn to nonvolatile memory devices 322 through the first to fourth channels CH1 to CH4 in an interleaving manner. In an embodiment, memory controller 321 and nonvolatile memory devices 322 may be implemented with the structure (i.e., a plurality of channels and a plurality of ways) described with reference to FIG. 7.

Memory controller 321 may generate the corresponding parity PRT whenever each of the write data WRD1 to WRDn is transmitted to nonvolatile memory devices 322 and may release first buffer memory 321a (in detail, an area where the corresponding write data are stored) after the write data WRD1 to WRDn are transmitted to nonvolatile memory devices 322.

For example, memory controller 321 may transmit the first write data WRD1 to the corresponding one of nonvolatile memory devices 322 through the first channel CH1. In addition, memory controller 321 may generate the parity PRT based on the first write data WRD1 and default parity.

Afterwards, memory controller 321 may transmit the write data WRD2 to WRDn to nonvolatile memory devices 322 through the first to fourth channels CH1 to CH4 in the interleaving manner and may update the parity PRT based on each of the write data WRD2 to WRDn.

Memory controller 321 may release first buffer memory 321a (in detail, an area where the corresponding write data are stored), at a point in time when each of the write data WRD1 to WRDn is completely transmitted (or a point in time when parity based on each of the write data WRD1 to WRDn is updated). That is, first buffer memory 321a may be released respectively at points in time t1 to tn before each of the write data WRD1 to WRDn is successfully completely programmed.

Afterwards, second buffer memory 321b may be released after all the first to n-th write data WRD1 to WRDn are successfully programmed. In an embodiment, in the write data WRD1 to WRDn, "n" may correspond to "the number of channels"×"the number of ways" in storage device 320. Alternatively, "n" may be a value that is in advance defined to secure the reliability of write data and to optimize write performance.

As described above, memory controller 321 may prevent reduction in performance due to a limited capacity of a write buffer and a write delay by transmitting a write completion and releasing a write buffer before the write data WRD1 and WRDn are completely programmed. Also, memory controller 321 may secure the reliability of the write data WRD1 to WRDn by generating the parity PRT associated with the write data WRD1 to WRDn and maintaining the parity PRT until all the write data WRD1 to WRDn are completely programmed.

Figure 17:
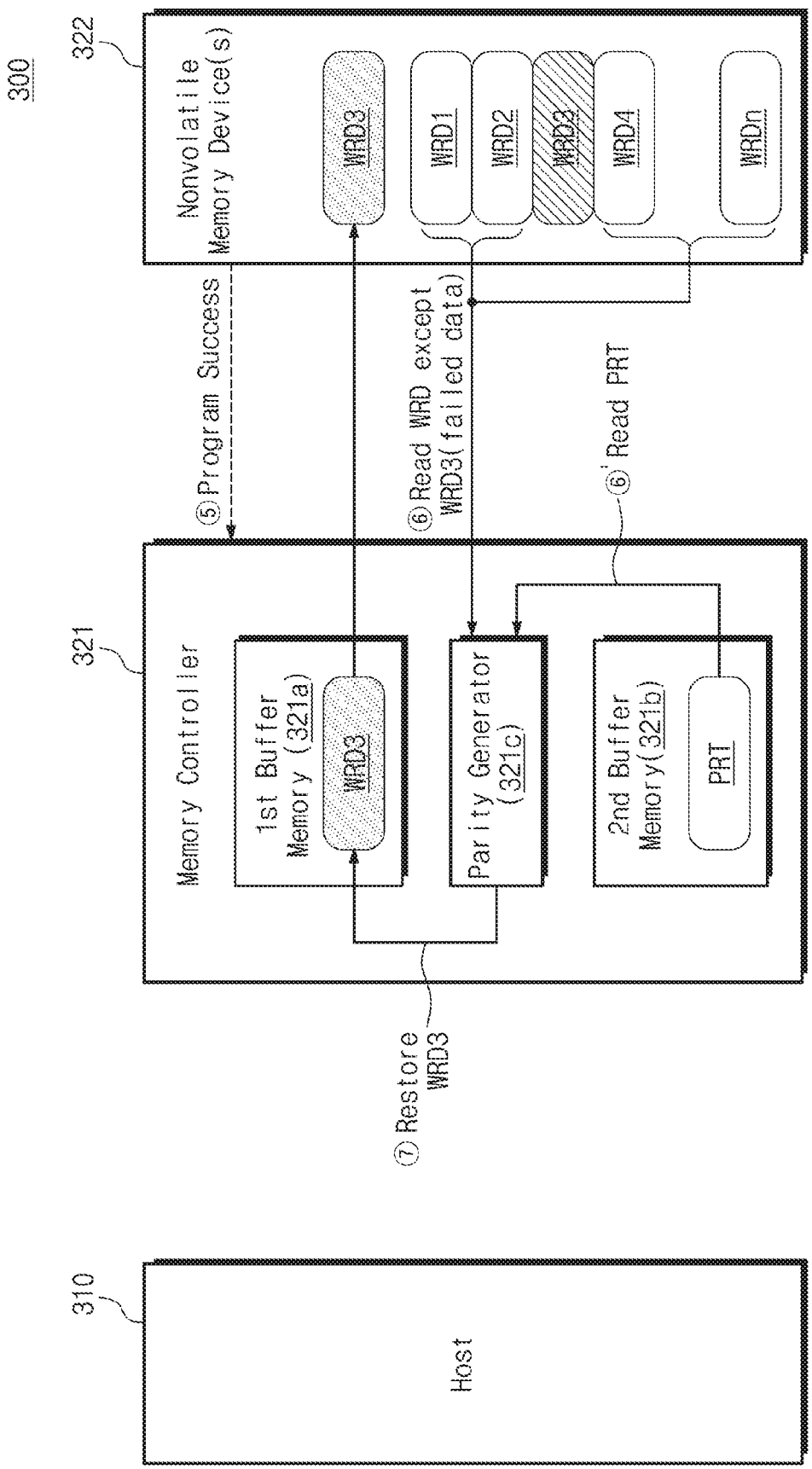
FIG. 17 is a view for describing a method in which the memory controller restores write data in a program failure situation.

FIG. 17 is a view for describing a method in which memory controller 321 restores write data in a program failure situation. For a brief description, elements that are unnecessary to describe the method in which memory controller 321 restores write data in a program failure situation will not be repeated here.

Also, in the embodiment of FIG. 17, it is assumed that memory controller 321 repeatedly performs the operations ①, ②, ③, and ④ of FIG. 15 on the write data WRD1 to WRDn. That is, it is assumed that the write data WRD1 to WRDn have been transmitted to nonvolatile memory devices 322, first buffer memory 321a has been released, and second buffer memory 321b has stored the parity PRT associated with the write data WRD1 to WRDn. Also, for brevity of illustration and convenience of description, nonvolatile memory devices 322 are illustrated with one block, and it is assumed that a program operation of the third write data WRD3 fails.

However, embodiments of the inventive concept may not be limited thereto. For example, nonvolatile memory devices 322 may be respectively implemented with different devices, may be divided into a plurality of ways, and may communicate with memory controller 321 through a plurality of channels. Also, the write data WRD1 to WRDn may be respectively stored in different nonvolatile memory devices.

Referring to FIGS. 16 and 17, as described above, memory controller 321 may transmit the write data WRD1 to WRDn to nonvolatile memory devices 322 in an interleaved manner. In this case, memory controller 321 may generate the parity PRT associated with the write data WRD1 to WRDn and may store the generated parity PRT in second buffer memory 321b.

Nonvolatile memory devices 322 may perform program operations on the received write data WRD1 to WRDn. According to the above assumption, the program operation of the third write data WRD3 may fail. Memory controller 321 may receive information indicating that the program operation of the third write data WRD3 fails (⑤). Although not illustrated in FIG. 17, memory controller 321 may receive information about a program success of each of the remaining write data WRD1, WRD2, and WRD4 to WRDn.

Memory controller 321 may read the remaining write data WRD1, WRD2, and WRD4 to WRDn except for the write data WRD3 corresponding to the program failure from nonvolatile memory devices 322 in response to the received information (⑥). In an embodiment, reading the write data from nonvolatile memory devices 322 may be performed after the remaining write data WRD1, WRD2, and WRD4 to WRDn except for the write data WRD3 corresponding to the program failure are successfully completely programmed.

Memory controller 321 may read the parity PRT stored in second buffer memory 321b (⑥'), and may restore the write data (i.e., the third data WRD3) corresponding to the program failure based on the parity PRT and the read write data WRD1, WRD2, and WRD4 to WRDn (⑦). For example, as described above, parity generator 321c may restore the third write data WRD3 by performing a bitwise XOR operation on the parity PRT and the write data WRD1, WRD2, and WRD4 to WRDn. The restored third write data WRD3 may be stored in first buffer memory 321a, and memory controller 321 may transmit the restored third write data WRD3 to nonvolatile memory devices 322 such that the restored third write data WRD3 are stored in nonvolatile memory devices 322.

An embodiment of a method in which data are restored when a program operation of one of the write data WRD1 to WRDn fails is described with reference to FIG. 17. However, embodiments of the inventive concept may not be limited thereto. For example, pieces of write data may be restored in a state where program operations of pieces of write data fail, by increasing the number of parties. In embodiments, the plurality of parities may be stored in second buffer memory 321b, or some of the plurality of parities may be stored in nonvolatile memory devices 322.

As described above, storage device 320 according to an embodiment of the inventive concept may prevent a write delay by performing transmitting of write completion and releasing of a write buffer before pieces of write data are successfully completely programmed. Also, in the case where program operations associated with some of pieces of write data fail, storage device 320 may restore write data corresponding to a program failure based on the remaining write data and parity. Accordingly, a storage device with improved performance and reliability is provided.

Figure 18:
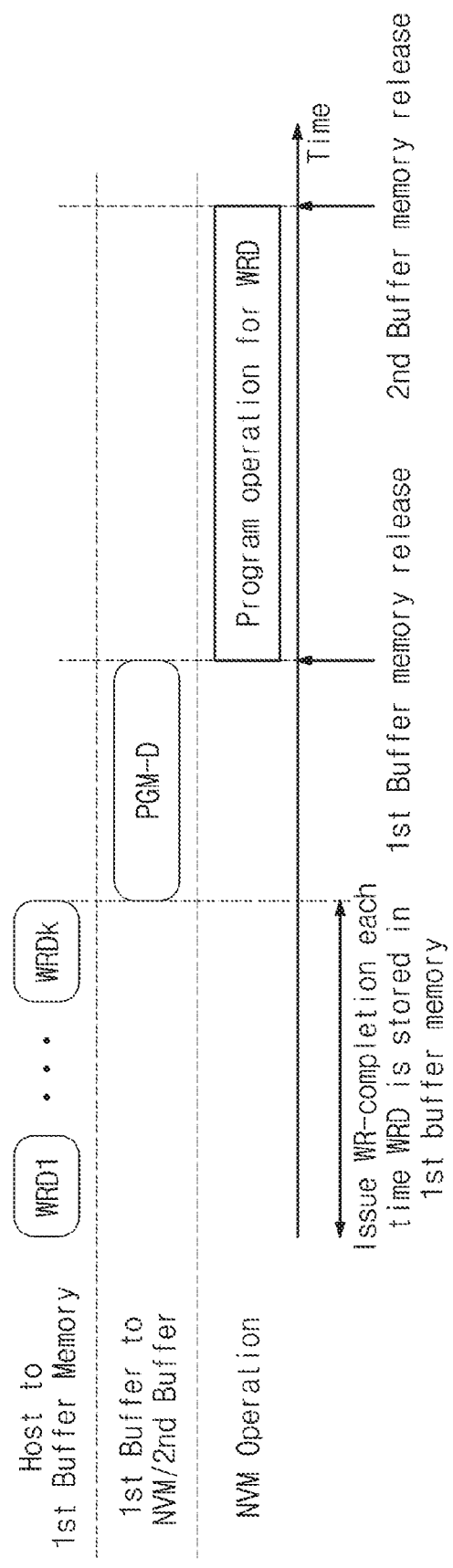
FIG. 18 is a timing diagram for describing an embodiment of a data transfer unit.

FIG. 18 is a timing diagram for describing an embodiment of a data transfer unit. In an embodiment, to describe the scope and spirit of the inventive concept clearly, embodiments are above described under assumption that a data transfer unit between host 110, 210, or 310 and memory controller 121, 221, or 321 is the same as a data transfer unit between memory controller 121, 221, or 321 and nonvolatile memory devices 122, 222, or 322. However, embodiments of the inventive concept may not be limited thereto.

For example, a data transfer unit between host 110, 210, or 310 and memory controller 121, 221, or 321 may be determined depending on a predefined interface or protocol between host 110, 210, or 310 and memory controller 121, 221, or 321 or a file system of host 110, 210, or 310. For example, a data transfer unit between memory controller 121, 221, or 321 and nonvolatile memory devices 122, 222, or 322 may be determined depending on a predefined interface or protocol between memory controller 121, 221, or 321 and nonvolatile memory devices 122, 222, or 322 or operation characteristics of nonvolatile memory devices 122, 222, or 322. That is, the data transfer units may be different from each other.

For example, the data transfer unit between host 110, 210, or 310 and memory controller 121, 221, or 321 may correspond to a sector unit (e.g., 4 KB), and the data transfer unit between memory controller 121, 221, or 321 and nonvolatile memory devices 122, 222, or 322 may correspond to a program unit or a page unit (e.g., 96 KB) of nonvolatile memory devices 122, 222, or 322. That is, memory controller 121, 221, or 321 may receive pieces of write data from host 110, 210, or 310; if the pieces of write data constitute the program unit, memory controller 121, 221, or 321 may transmit data of the program unit to nonvolatile memory devices 122, 222, or 322.

As a detailed example, it is assumed that pieces of write data WRD1 to WRDk constitute data of one program unit. As illustrated in FIG. 8, the pieces of write data WRD1 to WRDk may be transmitted from host 110, 210, or 310 to first buffer memory 121a, 221a, or 321a. In this case, memory controller 121, 221, or 321 may transmit the WR-completion to host 110, 210, or 310 whenever each of the write data WRD1 to WRDk is transmitted to first buffer memory 121a, 221a, or 321a.

Afterwards, memory controller 121, 221, or 321 may transmit data PGM-D of one program unit to nonvolatile memory devices 122, 222, or 322. In this case, as in the above-described embodiments, memory controller 121, 221, or 321 may transmit the data PGM-D of the program unit to second buffer memory 123 and 211 or may generate the corresponding parity based on the data PGM-D of the program unit.

After the data PGM-D of the program unit are transmitted, memory controller 121, 221, or 321 may release first buffer memory 121a, 221a, or 321a. After programming is successfully completed in nonvolatile memory devices 122, 222, or 322, memory controller 121, 221, or 321 may release second buffer memory 123 or 211.

As described above, a storage device according to an embodiment of the inventive concept may transmit write completion to a host whenever write data received from the host are stored in a first buffer memory and may release the first buffer memory whenever data of a program unit are transmitted to nonvolatile memory devices. That is, the storage device may prevent a write delay by performing transmitting of write completion and releasing of a write buffer before the write data are successfully completely programmed. Also, the reliability of data may be secured by maintaining a variety of means (e.g., data stored in a buffer memory of a storage device, write data stored in an HBM of a host, or parity associated with write data) for restoring write data until the write data are successfully completely programmed.

Figure 19:
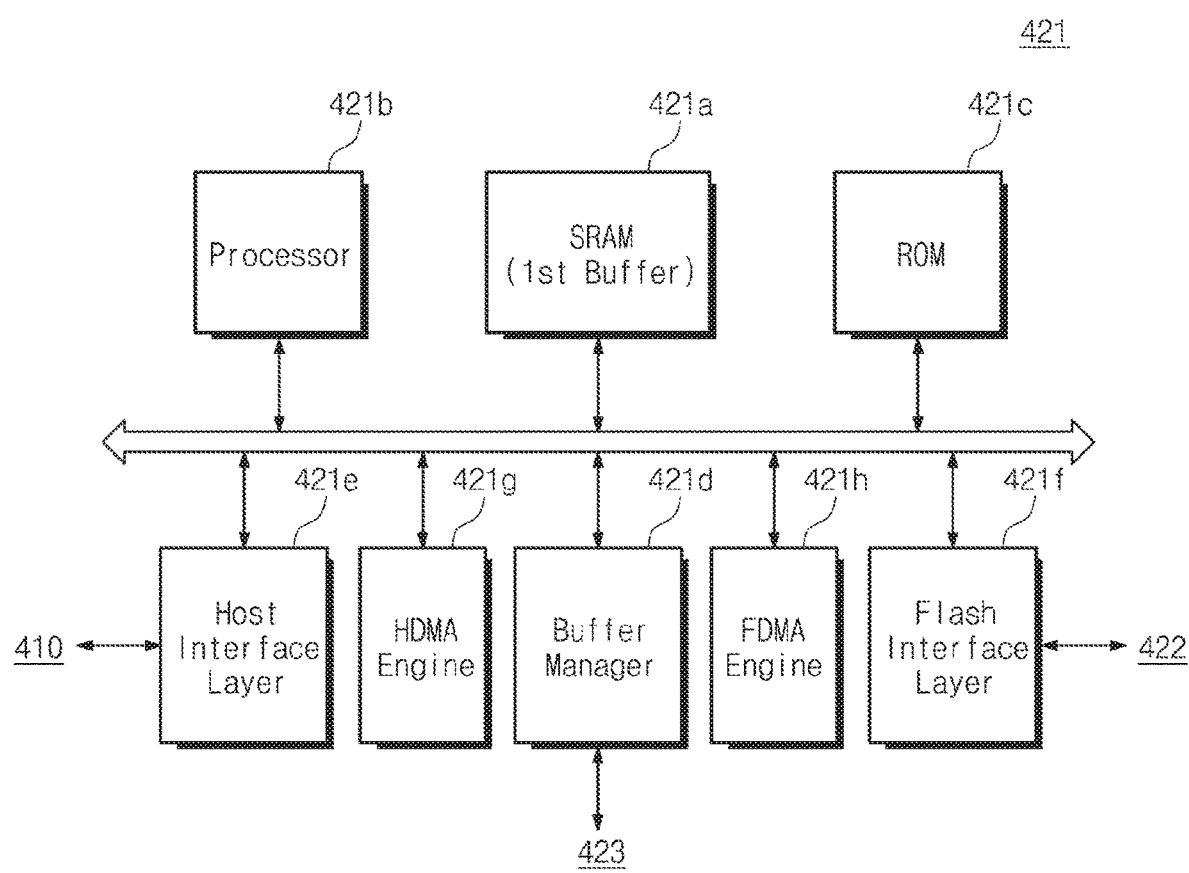
FIG. 19 is a block diagram illustrating a configuration of an embodiment of the memory controller.

FIG. 19 is a block diagram illustrating a configuration of an embodiment of a memory controller 421. For brevity's sake, a description that has already been given above in detail with reference to the above elements will not be repeated here.

Referring to FIG. 19, memory controller 421 may include a first buffer memory 421a, a processor 421b, a ROM 421c, a buffer manager 421d, a host interface layer 421e, a flash interface layer 421f, a first (host) direct memory access (HDMA) engine 421g, and a second (flash) direct memory access (FDMA) engine 421h. First buffer memory 421a, processor 421b, ROM 421c, buffer manager 421d, host interface layer 421e, and flash interface layer 421f are described with reference to FIG. 2, and a description thereof will not be repeated here.

Memory controller 421 of FIG. 19 may further include HDMA engine 421g and FDMA engine 421h. HDMA engine 421g may be a hardware device that controls a direct memory access (DMA) operation between a host 410 and first buffer memory 421a without intervention of processor 421b. FDMA engine 421h may be a hardware device that controls a DMA operation between first buffer memory 421a and nonvolatile memory devices 422, and a DMA operation between first buffer memory 421a and a second buffer memory 423.

For example, a storage device may operate in a DMA mode to improve a data transfer rate. The DMA mode may refer to an operation mode in which data are transferred under control of DMA engines 421g and 421h without intervention of processor 421b or a core included in memory controller 421. That is, since there is no need for control or processing from processor 421b or the core while data are transferred, the data transfer rate may be improved.

In the DMA mode of operation, HDMA engine 421g may control or manage data transfer between host 410 and first buffer memory 421a, and FDMA engine 421h may control or manage data transfer between first buffer memory 421a and nonvolatile memory devices 422 and data transfer between first buffer memory 421a and second buffer memory 423.

In an embodiment, write data transfer between a host and a first buffer memory described with reference to FIGS. 1 to 18 may be performed in the DMA mode. In this case, a HDMA operation associated with the write data transfer may be performed by HDMA engine 421g without intervention of processor 421b. Also, data transfer between the first buffer memory and nonvolatile memory devices and between the first buffer memory and the second buffer memory described with reference to FIGS. 1 to 18 may be performed in the DMA mode. In this case, a FDMA operation associated with the data transfer may be performed by FDMA engine 421h without intervention of processor 421b.

In an embodiment, although not illustrated in FIG. 19, memory controller 421 may further include a separate DMA engine that controls or manages a DMA operation between first buffer memory 421a and second buffer memory 423.

Memory controller 421 according to an embodiment of the inventive concept may transmit WR-completion to host 410 after the HDMA operation of receiving write data from host 410 is completed and may release first buffer memory 421a after the FDMA operation of transmitting data to nonvolatile memory devices 422 and to second buffer memory 423 is completed. Also, data may be normally restored even when a program operation fails, by releasing second buffer memory 423 after a program operation of nonvolatile memory devices 422 is successfully completed. Accordingly, a storage device with improved performance and reliability may be provided.

Figure 20:
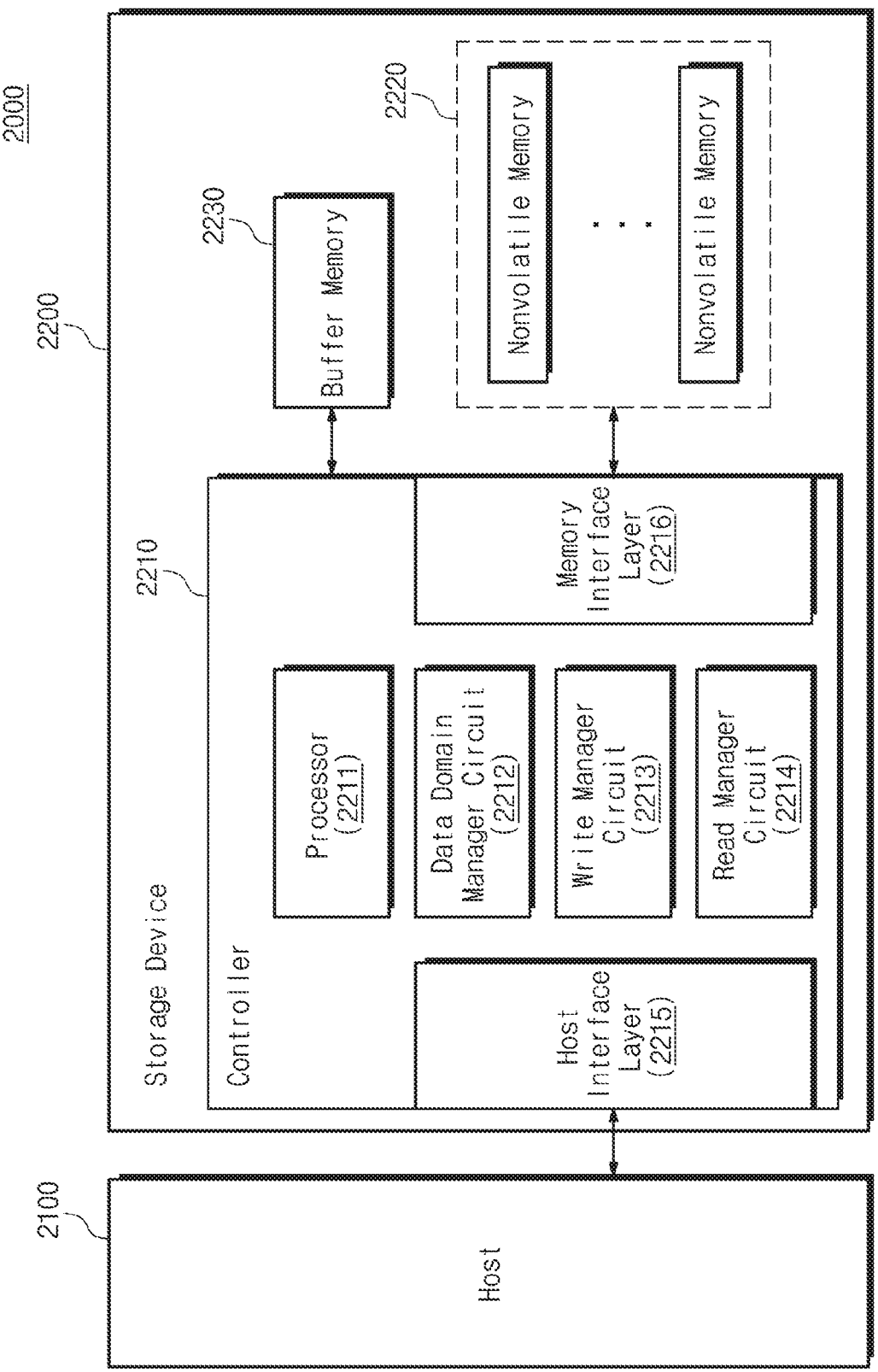
FIG. 20 is a block diagram illustrating an embodiment of a user system including a storage device.

FIG. 20 is a block diagram illustrating an embodiment of a user system including a storage device. Referring to FIG. 20, a user system 2000 may include a host 2100 and a storage device 2200. Host 2100 may store data in storage device 2200 or may read data stored in storage device 2200.

Storage device 2200 may include a controller 2210, a plurality of nonvolatile memory devices 2220, and a buffer memory 2230. Controller 2210 may include a processor 2211, a data domain manager circuit 2212, a write manager circuit 2213, a read manager circuit 2214, a host interface layer 2215, and a memory interface layer 2216.

Processor 2211 may include at least one processor core. Processor 2211 may execute program code of software (SW) and/or firmware (FW) depending on an operation of the processor core.

Data domain manager circuit 2212 may be configured to manage a task of a first type associated with storage device 2200. For example, data domain manager circuit 2212 may obtain information about a state of at least one of nonvolatile memory devices 2220, write data, and read data, with regard to performing the task of the first type. Write manager circuit 2213 and read manager circuit 2214 may perform the task of the first type to provide a variety of state information to data domain manager circuit 2212. Data domain manager circuit 2212 may monitor states associated with operations of controller 2210 or nonvolatile memory devices 2220 based on the obtained information.

Write manager circuit 2213 may manage the task of the first type (in particular, a write task). For example, write manager circuit 2213 may manage a write operation for storing write data from host 2100 in nonvolatile memory devices 2220. In an embodiment, write manager circuit 2213 may be placed on a write path for transferring write data from host 2100 to nonvolatile memory devices 2220.

Read manager circuit 2214 may manage a task of the first type (in particular, a read task). For example, read manager circuit 2214 may manage a read operation for outputting read data to the outside (e.g., host 2100) of controller 2210. In an embodiment, read manager circuit 2214 may be placed on a read path for transferring read data output from nonvolatile memory devices 2220 to the outside of controller 2210.

In an embodiment, write manager circuit 2213 may include a buffer memory and read manager circuit 2214 may include a separate buffer memory. The buffer(s) may be used as a write buffer or a read buffer of storage device 2200.

In an embodiment, data domain manager circuit 2212, write manager circuit 2213, and read manager circuit 2214 may be implemented in the form of hardware and may be configured to manage the task of the first type. In an embodiment, the first type task may include simple tasks such as a data write operation and a data read operation. Alternatively, the first type task may include a task associated with a first processing unit (e.g., a page unit).

In an embodiment, a task of a second type that is different from the task of the first type may be processed by software (SW) and/or firmware (FW) driven by the processor 2211. In an embodiment, the second type task may include maintenance tasks such as a garbage collection operation, a wear leveling operation, a read reclaim operation, a read refresh operation, and an error correction operation associated with nonvolatile memory devices 2220. In an embodiment, the second type task may include a task associated with a second processing unit (e.g., a memory block unit) that is different from the first processing unit (e.g., a page unit).

In an embodiment, the first type tasks (i.e., simple tasks) such as a data read operation and a data write operation may be performed by a hardware circuit, and the maintenance operation may be processed by software (SW) and/or firmware (FW) executed by processor 2211, thereby improving the overall performance of storage device 2200.

In an embodiment, write manager circuit 2213 and read manager circuit 2214 may operate based on the operation methods described with reference to FIGS. 1 to 19. For example, write manager circuit 2213 may be configured to transmit write completion to host 2100 after receiving write data from host 2100 and to release an internal buffer after transmitting the write data to nonvolatile memory devices 2220. Also, write manager circuit 2213 may secure the reliability of write data by transmitting the write data to buffer memory 2230 (or an HBM of host 2100) or generating parity while transmitting the write data to nonvolatile memory devices 2220.

Controller 2210 may communicate with host 2100 through host interface layer 2215. For example, host interface layer 2215 may convert a command and data received from host 2100 into a format capable of being processed in controller 2210 and vice versa. Controller 2210 may communicate with nonvolatile memory devices 2220 through memory interface layer 2216. For example, memory interface layer 2216 may convert write data and relevant data into a format capable of being identified in nonvolatile memory devices 2220 and may vice versa.

In an embodiment, host interface layer 2215 and memory interface layer 2216 may include a packetizer for converting data or information into a format used in controller 2210 and a depacketizer.

A storage device according to an embodiment of the inventive concept may prevent reduction in performance due to a limited capacity of a write buffer and a write delay by transmitting a write completion and releasing a write buffer before write data are successfully completely programmed and may secure the reliability of write data by maintaining the write data in a separate buffer until the write data are successfully completely programmed and restoring the write data when a program operation fails.

Accordingly, it may be possible to provide an operation method of a memory controller having improved reliability and performance and an operation method of a user device.

The various operations of methods described above may be performed by any suitable means capable of performing the operations, such as various hardware and/or software component(s), circuits, and/or module(s).

Any software employed in the disclosed systems and/or methods may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, instructions or code for executing the functions may be stored on or transmitted over a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A system, comprising:
    a nonvolatile memory;
    a memory controller configured to control the nonvolatile memory, the memory controller including a first buffer memory for temporarily storing write data, received from a host device, to be written to the nonvolatile memory; and
    a second buffer memory having a lower operational speed and a higher memory capacity than the first buffer memory,
    the memory controller being configured to transmit the write data from the first buffer memory to the second buffer memory and to the nonvolatile memory, and to release an operational state of the first buffer memory after transmitting the write data from the first buffer memory to the second buffer memory and to the nonvolatile memory, and to transmit a write completion signal to the host device prior to successfully programming the write data into the nonvolatile memory,
    wherein writing additional write data to the first buffer memory is prohibited prior to the release of the operational state of the first buffer memory, and writing the additional write data to the first buffer memory is permitted after the release of the operational state of the first buffer memory.

2. The system of claim 1, wherein the memory controller is configured to transmit the write data to the nonvolatile memory concurrently with transmission of the write data to the second buffer memory.

3. The system of claim 1, wherein the operational state of the first buffer memory is released in response to completion of the write data being transmitted to the second buffer memory and the nonvolatile memory.

4. The system of claim 1, wherein the nonvolatile memory is configured to generate a write pass signal when the write data transmitted from the first buffer memory has been successfully stored in the nonvolatile memory, and to generate a write fail signal when the write data transmitted from the first buffer memory has not been successfully stored in the nonvolatile memory, and wherein the operational state of the first buffer memory is released before the nonvolatile memory generates the write pass signal or the write fail signal.

5. The system of claim 1, wherein the nonvolatile memory includes a plurality of nonvolatile memory devices, and the first buffer memory includes a plurality of storage areas respectively corresponding to the plurality of nonvolatile memory devices.

6. The system of claim 1, wherein the memory controller includes a first direct memory access (DMA) engine for controlling operations between the host device and the first buffer memory, and a second DMA engine for controlling operations between first buffer memory and the second buffer memory, and between the first buffer memory and the nonvolatile memory.

7. The system of claim 1, wherein the memory controller includes a write manager circuit and a read manager circuit, and wherein the first buffer memory is in the write manager circuit, and a separate buffer memory is in the read manager circuit.

8. A memory system, comprising:
    a nonvolatile memory;
    a memory controller comprising a write buffer for temporarily storing write data, received from a host device, to be stored in the nonvolatile memory, the memory controller being configured to transmit the write data from the write buffer to the nonvolatile memory; and
    the memory controller further being configured to transmit a write completion signal to the host device prior to successfully programming the write data into the nonvolatile memory and to release an operational status of the write buffer prior to confirmation of a successful write of the write data transmitted to the nonvolatile memory,
    wherein writing additional write data to the write buffer memory is prohibited prior to the release of the operational state of the write buffer, and writing of the additional write data to the write buffer is permitted after the release of the operational state of the write buffer.

9. The memory system of claim 8, where the memory controller further comprises a buffer manager configured to control a random access memory for backing up the write data.

10. A method, comprising:
    a first buffer memory of a memory controller temporarily storing write data, received from a host device, to be written to a nonvolatile memory;
    the memory controller transmitting the write data from the first buffer memory to the nonvolatile memory and to a second buffer memory having a lower operational speed and a higher memory capacity than the first buffer memory; and
    the memory controller transmitting a write completion signal to the host device prior to successfully programming the write data into the nonvolatile memory and releasing an operational state of the first buffer memory after transmitting the write data from the first buffer memory to the second buffer memory and to the nonvolatile memory,
    wherein writing of additional write data to the first buffer memory is prohibited prior to the release of the operational state of the first buffer memory, and writing of the additional write data to the first buffer memory is permitted after the release of the operational state of the first buffer memory.

11. The method of claim 10, further comprising transmitting the write data to the nonvolatile memory concurrently with transmitting the write data to the second buffer memory.

12. The method of claim 10, further comprising releasing the operational state of the first buffer memory in response to completion of the write data being transmitted to the second buffer memory and the nonvolatile memory.

13. The method of claim 10, further comprising the nonvolatile memory generating a write pass signal when the write data transmitted from the first buffer memory has been successfully stored in the nonvolatile memory, and generating a write fail signal when the write data transmitted from the first buffer memory has not been successfully stored in the nonvolatile memory, and wherein the operational state of the first buffer memory is released before the nonvolatile memory generates the write pass signal or the write fail signal.

14. The method of claim 13, further comprising the memory controller transmitting the write completion signal to the host device indicating that the first buffer memory is in a released operational state before the nonvolatile memory generates the write pass signal or the write fail signal.

15. The method of claim 14, further comprising releasing the operational state of the second buffer memory in response to the write pass signal generated by the nonvolatile memory, wherein writing to the second buffer memory is prohibited prior to the release of the operational state of the first buffer memory, and wherein the second buffer memory in the released operational state is configured to receive second write data from the first buffer memory.

16. The method of claim 13, further comprising when the nonvolatile memory generates the write fail signal, transmitting the write data is from the second buffer memory to the first buffer memory, and then transmitting the write data again from the first buffer memory to the nonvolatile memory.

17. The method of claim 13, further comprising when the nonvolatile memory generates the write fail signal, transmitting the write data from the second buffer memory to the nonvolatile memory.

* * * * *